United States Patent
Kurts et al.

(10) Patent No.: US 10,628,542 B2
(45) Date of Patent: Apr. 21, 2020

(54) CORE-ONLY SYSTEM MANAGEMENT INTERRUPT

(71) Applicant: Intel Corporation, Santa Clara, CA (US)

(72) Inventors: Tsvika Kurts, Haifa (IL); Alexander Gendler, Kiriat Motzkin (IL); Larisa Novakovsky, Haifa (IL); Anwar Azaarura Zaa'Rura, Nazareth (IL); Afik Sela, Ramat Ishay (IL); Genadi Kazakevich, Haifa (IL); Alexandra Shainshein, Afula (IL); Ariel Sabba, Karmiel (IL)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 15/640,532

(22) Filed: Jul. 1, 2017

(65) Prior Publication Data

US 2019/0005160 A1     Jan. 3, 2019

(51) Int. Cl.
| | |
|---|---|
| *G06F 17/50* | (2006.01) |
| *G01R 31/317* | (2006.01) |
| *G06F 11/30* | (2006.01) |
| *G06F 11/34* | (2006.01) |
| *G06F 11/36* | (2006.01) |

(52) U.S. Cl.
CPC ..... *G06F 17/504* (2013.01); *G01R 31/31704* (2013.01); *G01R 31/31705* (2013.01); *G06F 11/3024* (2013.01); *G06F 11/3466* (2013.01); *G06F 11/36* (2013.01); *G06F 2201/87* (2013.01); *G06F 2217/02* (2013.01)

(58) Field of Classification Search
None
See application file for complete search history.

(56) References Cited

U.S. PATENT DOCUMENTS

| | | | | |
|---|---|---|---|---|
| 2006/0101309 | A1* | 5/2006 | Mohiuddin | G06F 11/261 714/33 |
| 2010/0241414 | A1* | 9/2010 | Yeh | G06F 17/5022 703/14 |
| 2014/0052930 | A1* | 2/2014 | Gulati | G06F 11/22 711/141 |
| 2014/0143463 | A1* | 5/2014 | Mou | G06F 11/349 710/110 |
| 2015/0227410 | A1* | 8/2015 | Jarrett | G06F 11/0778 714/45 |
| 2016/0314055 | A1* | 10/2016 | Bagchi | G06F 11/362 |
| 2018/0102935 | A1* | 4/2018 | Curtis | H04L 43/045 |

\* cited by examiner

*Primary Examiner* — Jack Chiang
*Assistant Examiner* — Aric Lin
(74) *Attorney, Agent, or Firm* — Alliance IP, LLC

(57) ABSTRACT

An apparatus, including: a deterministic monitored device; an interconnect to communicatively couple the monitored device to a support circuit; a super queue to queue transactions between the monitored device and the support circuit, the super queue including an operational segment and a shadow segment; a debug data structure; and a system management agent to monitor transactions in the operational segment, log corresponding transaction identifiers in the shadow segment, and write debug data to the debug data structure, wherein the debug data are at least partly based on the corresponding transaction identifiers.

22 Claims, 21 Drawing Sheets

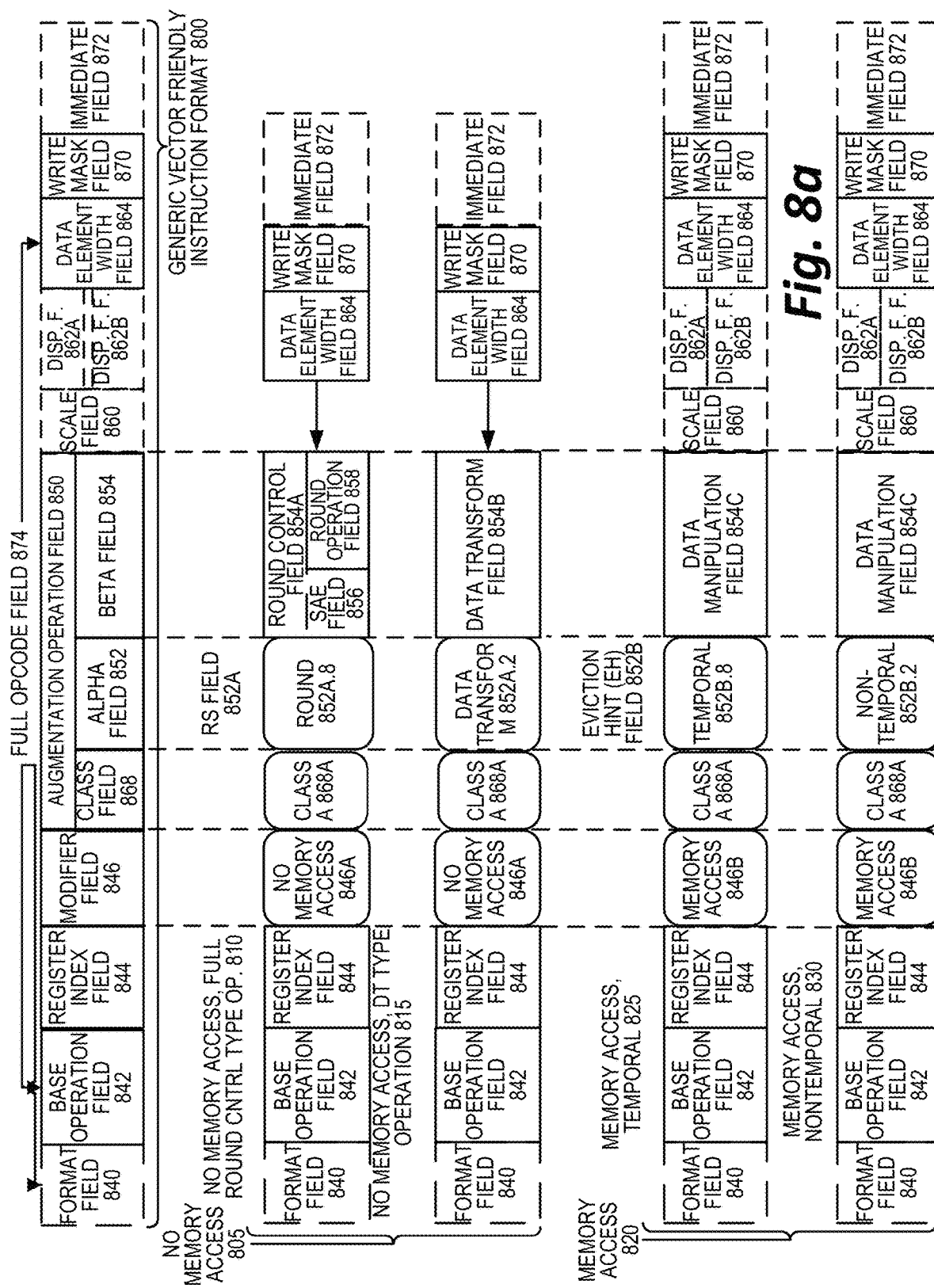

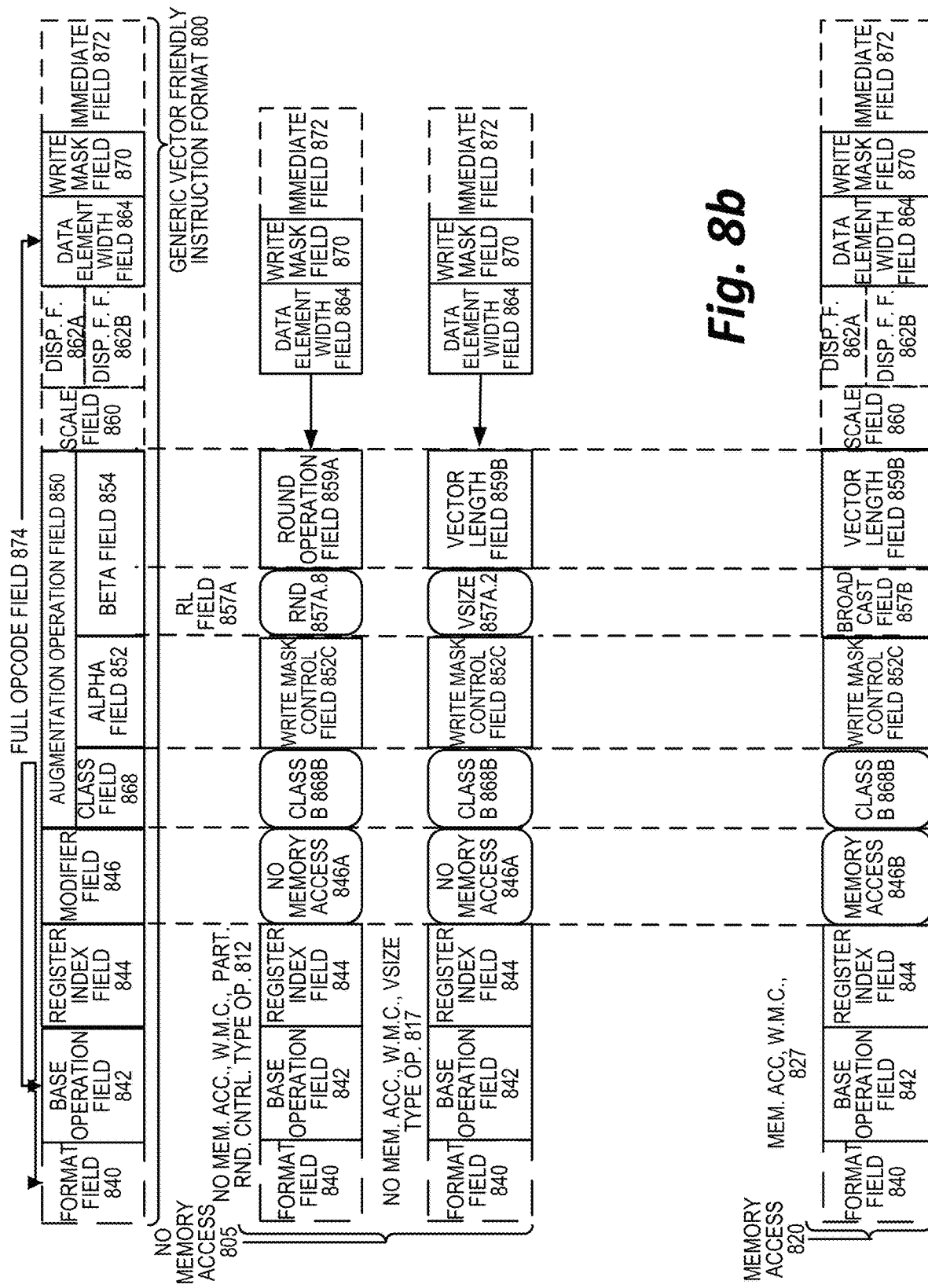

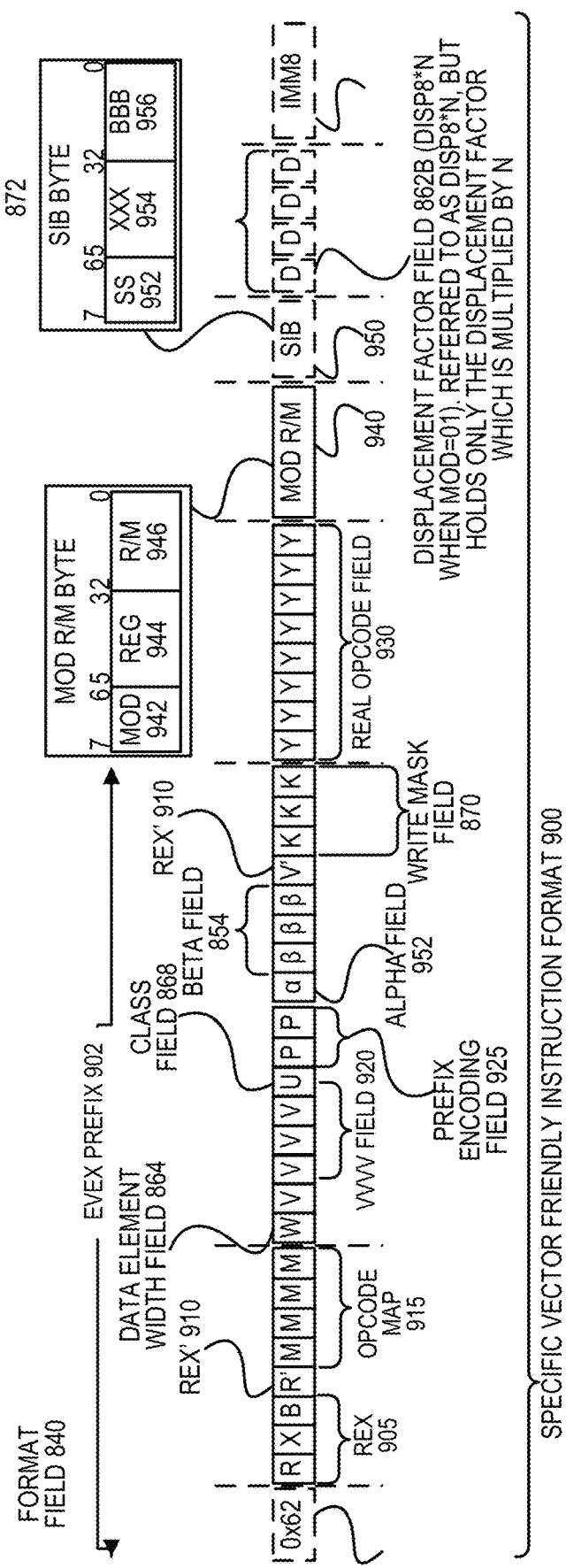

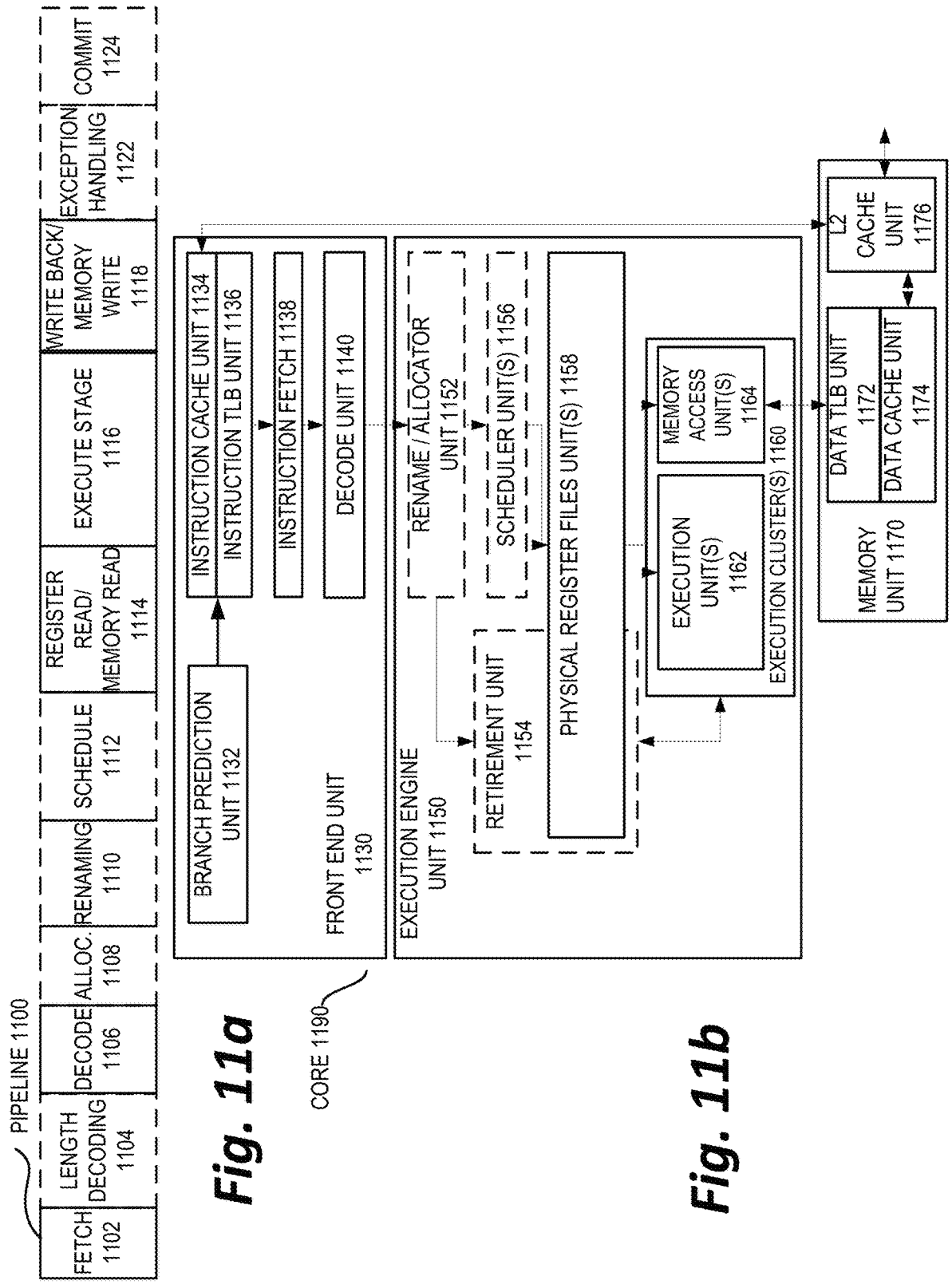

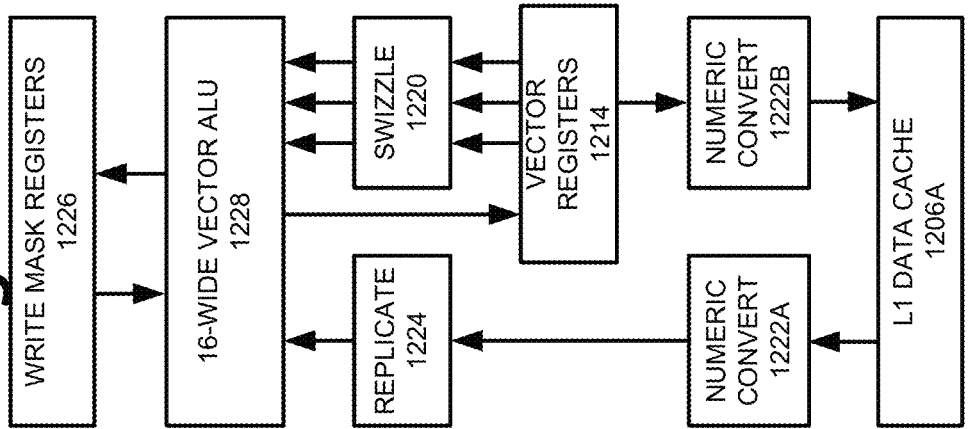
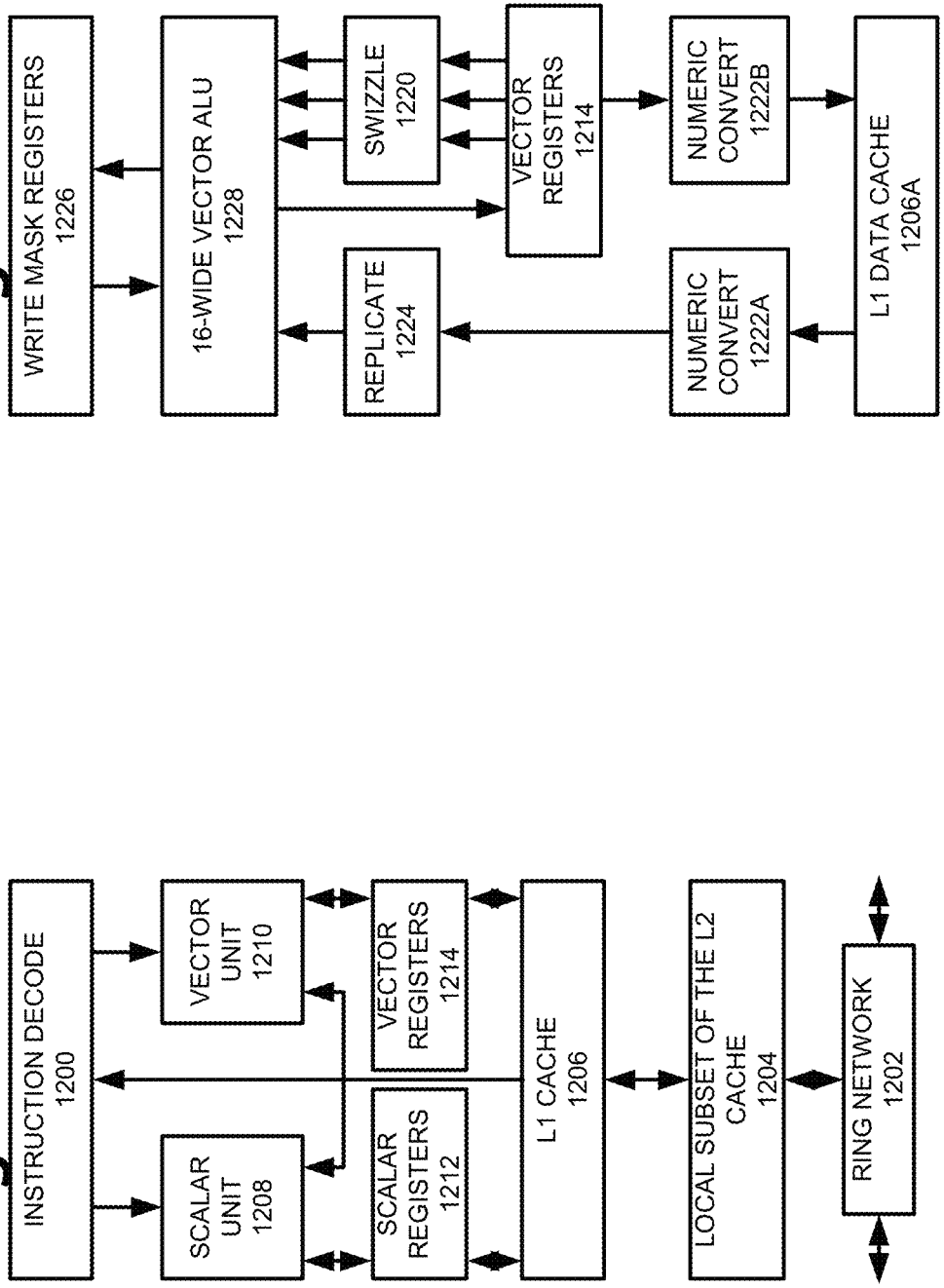

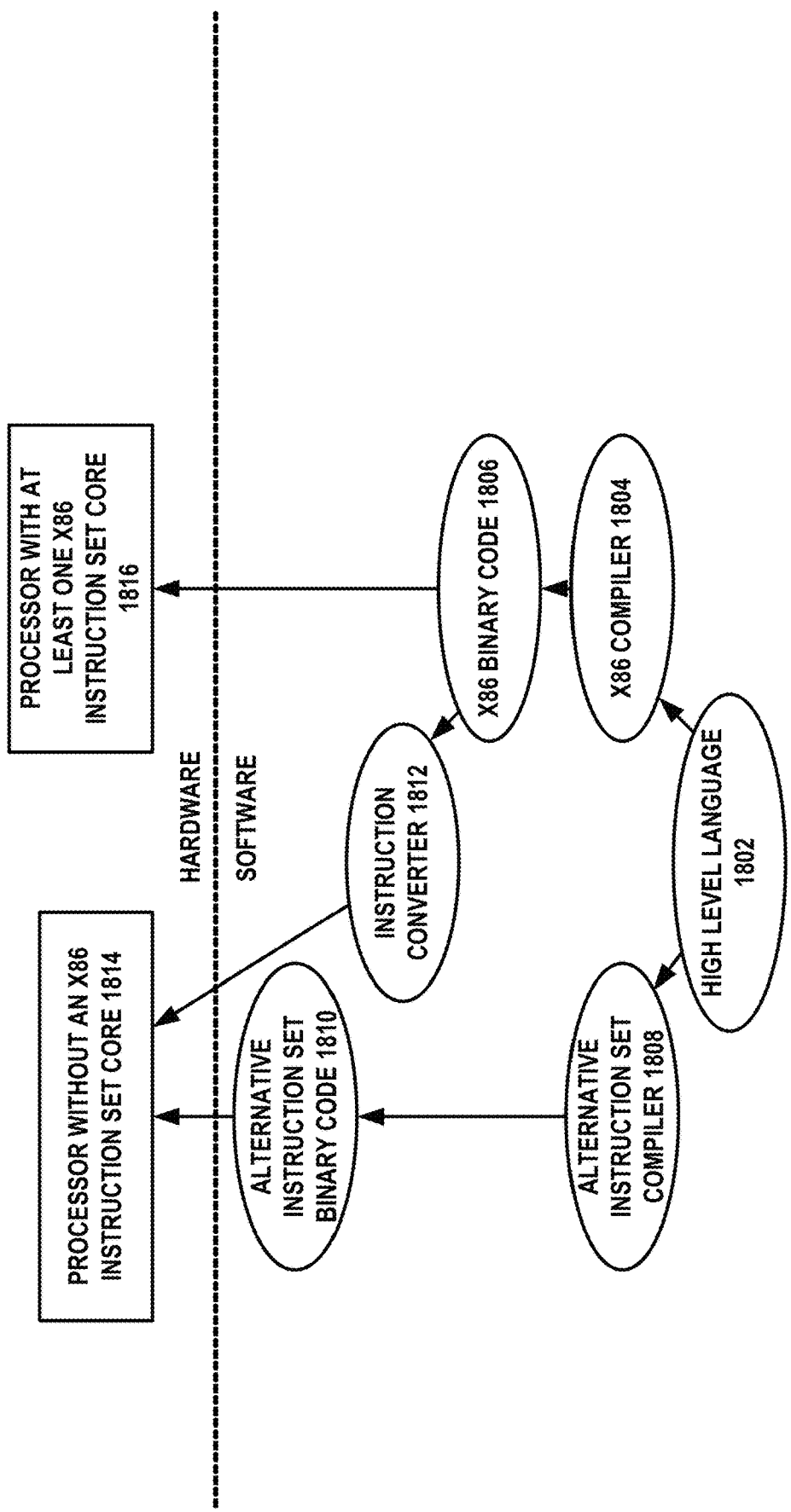

CORE-ONLY SYSTEM MANAGEMENT INTERRUPT

FIELD OF THE SPECIFICATION

This disclosure relates in general to the field of semiconductor devices, and more particularly, though not exclusively, to a system and method for core-only periodic system management interrupt (PSMI).

BACKGROUND

Multiprocessor systems are becoming more and more common. In the modern world, compute resources play an ever more integrated role with human lives. As computers become increasingly ubiquitous, controlling everything from power grids to large industrial machines to personal computers to light bulbs, the demand for ever more capable processors increases. As computer involvement in our daily life increases, the potential of damage due to error or malfunctioning components is increased dramatically. Thus, there is significant value in methodically determining the root cause of malfunctions within computer cores or processors.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIGS. 8a-8b are block diagrams illustrating a generic vector-friendly instruction format and instruction templates thereof according to one or more examples of the present specification.

FIGS. 9a-9d are block diagrams illustrating an example specific vector-friendly instruction format according to one or more examples of the present specification.

FIG. 11a is a block diagram illustrating both an example in-order pipeline and an example register renaming an out-of-order issue/execution pipeline according to one or more examples of the present specification.

FIG. 11b is a block diagram illustrating both an example of an in-order architecture core and an example register renaming an out-of-order issue/execution architecture core to be included in a processor according to one or more examples of the present specification.

FIGS. 12a-12b illustrate a block diagram of a more specific in-order core architecture, which core would be one of several logic blocks (including other cores of the same type and/or different types) in a chip according to one or more examples of the present specification.

FIG. 18 is a block diagram contrasting the use of a software instruction converter to convert binary instructions in a source instruction set to binary instructions in a target instruction set according to one or more examples of the present specification.

EMBODIMENTS OF THE DISCLOSURE

Figure 1:
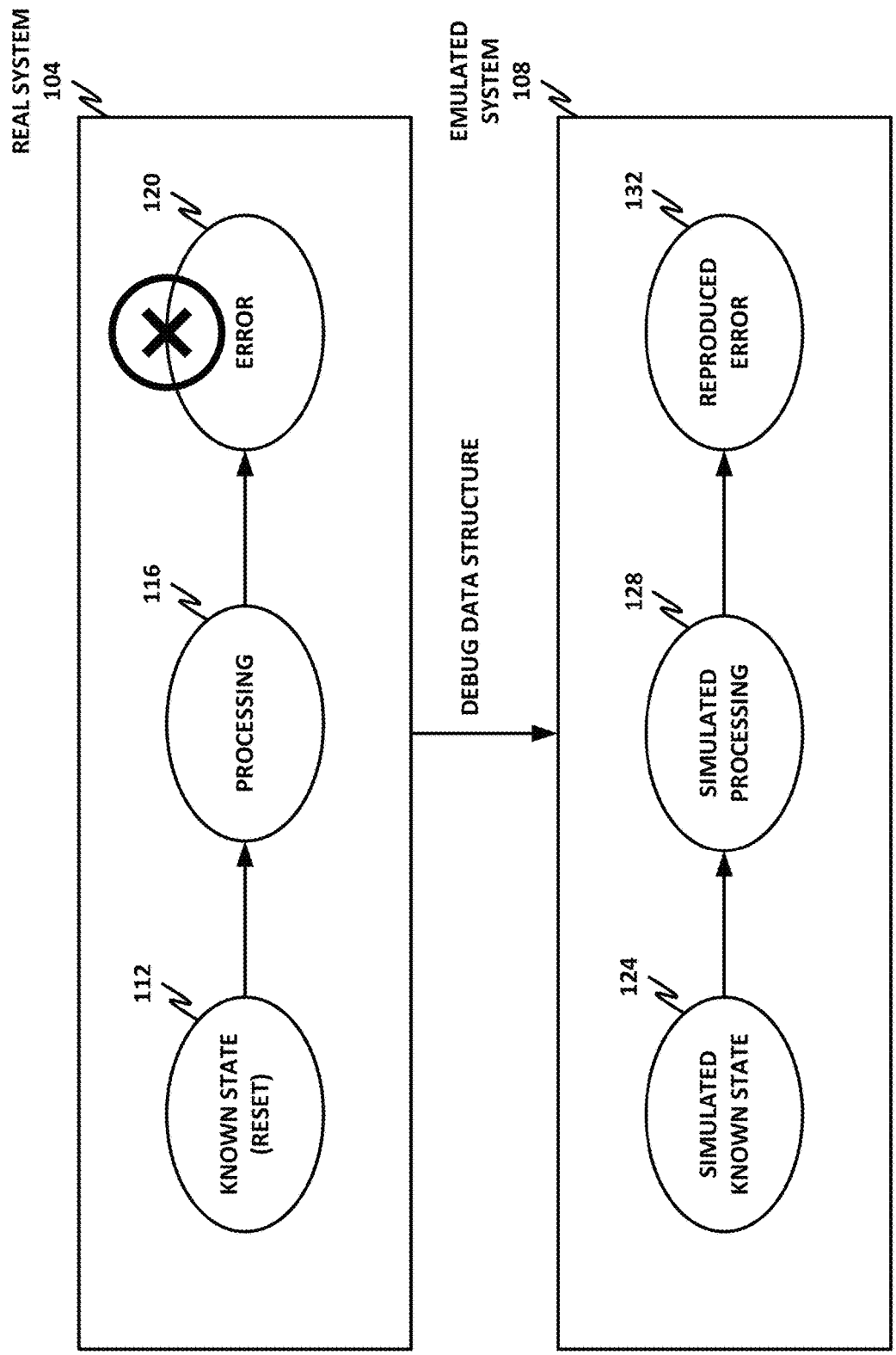
FIG. 1 is a block diagram illustrating selected elements of a debugging architecture, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Emulation is a feature that vendors of integrated circuits, such as microprocessors and systems-on-a-chip, may use to improve upon and debug their silicon designs. For example, a system may be started from a known state, such as a reset state, or some other known state, and transactions may be logged, including timestamps that tie the transactions to a particular clock cycle, so that the processor state can be reconstructed in an emulator later. Logged transactions may be stored in a debugging data structure, which is configured to hold the information necessary for reconstructing the processor state in later emulation. If the processor encounters an error during execution, then the debug information may be flushed to a disk, and the debug data structure may then be used to "replay" the processor sequence in an emulator. Ideally, the emulator faithfully emulates the processor function and stays synchronized, and will encounter the same error at the same clock count.

If the emulator works correctly, then system designers can use the emulator to debug the system and perform a root cause analysis on the silicon design.

The Intel® periodic system management interrupt (PSMI) has long been a core component of the Intel® debug architecture, while other microprocessor manufacturers provide similar system management interrupt (SMI) features. Thus, it should be noted that throughout this specification, PSMI is used as a representative of a class of SMI features that may be provided in many different platforms that enable them to operate in a system management mode (SMM) or similar mode, and should be understood as a nonlimiting example.

Figure 13:
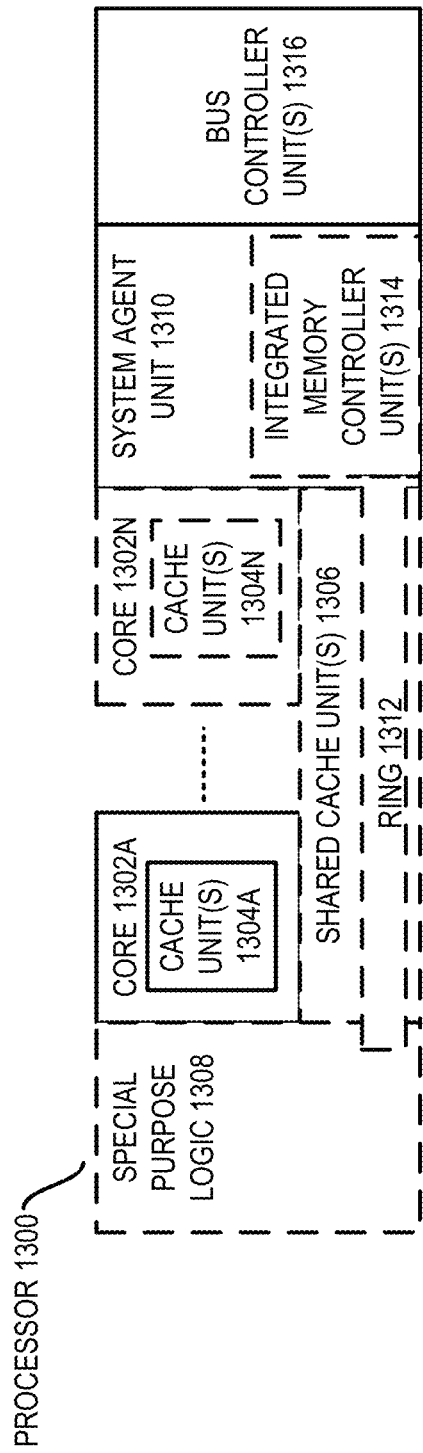
FIG. 13 is a block diagram of a processor that may have more than one core, may have an integrated memory controller, and may have integrated graphics according to one or more examples of the present specification.

A system agent, such as the system agent of FIG. 13, may act as a system management agent for PSMI purposes. PSMI provides very useful debugging and root cause analysis features. Debugging at the system level can be difficult because observability may be limited to the external bus, which can be far away in time (in terms of processor cycles) from the actual failure and its root cause. Thus, an emulator may be used to attempt to replay the whole scenario on a clock-by-clock basis to attempt to reproduce the system failure. Reproducing the failure on an emulator is highly valuable, as this provides visibility to capabilities that can significantly accelerate determining the root cause of a bug. If failure is successfully reproduced in the emulator, then the designer can easily perform a root cause analysis. Within the emulator, the designer has insight into internal signaling and debug hooks. On the other hand, if the whole scenario is replayed and the failure does not manifest, then the designer may conclude that the issue is with a circuit or speed path, rather than a logic bug. In either case, PSMI helps to perform the root cause analysis. It should be noted that core-only PSMI does not provide a "crystal ball" to all core failures. However, practical implementation has shown PSMI to be a highly successful debug method.

PSMI collects all inputs to the PSMI boundary within the CPU from a microarchitectural known state up to the failure. This information may be stored in a debug data structure, which can be used in the replay on the emulator.

To faithfully reconstruct the processor state, debug data are collected so that the scenario can be replayed in a deterministic manner on an accurate clock-by-clock basis. However, as computing systems have become more complex, and CPU development has evolved, the deterministic domain of the PSMI was initially narrowed from the socket level to the system agent level. Thus, collecting deterministic data became more difficult. As processors have evolved, some processor applications have become so complex that it is impractical to provide a deterministic replay, and in those cases PSMI may be abandoned altogether. In other examples, large investments may need to be made to ensure that the support circuitry (e.g., Intel® uncore) portion of a system-on-a-chip remains deterministic so that the processor state can be faithfully replayed. However, this can be time-consuming and expensive.

In particular, modern design of a system-on-a-chip is largely moving toward an intellectual property (IP) block-based model. In the IP block model, certain circuits or subcircuits, including all or most of the support circuitry design in many cases, are embodied in preconfigured IP blocks that provide near "black box" functionality. These IP blocks can be independently developed and maintained, and have well-defined, modular inputs and outputs. This can significantly reduce cost and effort in designing an integrated circuit, and can lead to better reuse of certain resources.

However, the use of IP blocks presents additional challenges for PSMI. Because an SoC may be based on a number of nondeterministic components that no longer have tightly coupled timing and clocking correlations, the system as a whole loses its deterministic aspect. Furthermore, some IP blocks on an SoC may even be imported from third-party vendors, so that there is no visibility into the internal workings, and no practical way to make those IP blocks deterministic.

Thus, a modification to legacy PSMI architectures can be provided wherein a certain portion of an integrated circuit may be treated as deterministic, and the rest of the circuit or SoC may be treated as nondeterministic. The deterministic portion may be the processor core, or may be some other IP block such as an integrated graphics processor, or any other logical block that may need to be emulated and debugged. As long as the monitored device remains deterministic, it is not necessary for the rest of the system to be deterministic. Rather, transactions are logged at a virtual boundary defined between the deterministic and nondeterministic portions of the circuit. Logging of outbound transactions may be relatively less important, because those transactions do not generally provide a substantive effect on the processor state. However, logging of inbound transactions may be relatively more important, as inbound transactions do affect the processor state.

Advantageously, the so-called "core only" PSMI of the present specification provides a clock-by-clock accurate and deterministic debug structure for the core or other monitored device, and also provides minimal intrusiveness or perturbations due to the operation of debug data that may be collected for later replay. Manifestly, if the collection of debug data itself becomes intrusive, that may itself become a source of errors.

In an embodiment of the present specification, the monitored device is treated as a hard IP block. Note that throughout this specification, a core is used in many illustrations and examples as a monitored device. This should be understood to be a nonlimiting and illustrative example of how the teachings of this specification can be applied to a specific monitored device. However, it should be understood that a practitioner in the art, exercising engineering skill, can apply the teachings to other devices, including other hard IP blocks, to provide some similar monitoring for those blocks. Thus, throughout this specification, where a core is spoken of as the monitored device, it should be understood to stand as a representative member of the entire class of devices that may be monitored according to the teachings herein.

In one example, the core virtual boundary, or the region of determinism, is defined at the in die interface (IDI) bus. An IP collection apparatus may define a method to sample all IDI input traffic.

In an example, IP collection and replay principles may be based on two different methods for tracing the input to the boundary. First, inbound collection data may be based on a record in the so-called super queue that queues transactions between the core and the support circuitry. This queue is referred to as a "super queue" because it is a multi-level queue, including an operational portion and a shadow portion. Collection of outbound transactions, on the other hand, may be based on an IDI on-die logic analyzer trigger (ODLAT) that records asynchronous events, snoops, and power management events. As used in this specification, "asynchronous" events should be understood to include events that occur outside of the cycle of the IDI bus transactions.

The use of these inbound and outbound methods in parallel allows the handling of deadlock conditions, and a balanced design effort.

Collection of inbound transactions may be set out as IDI transactions. These may be treated the same as other functional traffic. In many cases, inbound transactions may handle heavy data loads delivered on a 64-byte cache line, which can reach a bandwidth of approximately 60 Gb per second on dual channel double data rate (DDR) 3 memory.

Collection of outbound traffic may be sent via a debug trace fabric (DTF), which may be more limited, such as in one example to approximately 6.4 GB per second at a clock speed of 800 MHz. However, collection of outbound transactions may be performed asynchronously.

By limiting the collection of traffic to the IP perimeter, the teachings of the present specification allow collection of traffic in a deterministic fashion while limiting the volume of data collected. Furthermore, the heavy data transfer capability associated with the inbound traffic mitigates the intrusiveness of the core-only PSMI disclosed herein.

This provides advantages over certain legacy solutions that provide PSMI at the system agent level, but require the whole path between core and memory controller to be deterministic. Those legacy systems may be based on memory observability trace. Certain embodiments of this require full-chip simulation of core and support circuitry (e.g., uncore) to be clock-by-clock accurate. This requires both the core and the support circuitry to operate in a deterministic clock reference.

In embodiments of the present specification, the main source of traffic between the core and the support circuitry is the super queue (SQ). Thus, a core-only PSMI of the present specification may accurately sample all transactions that are input to the SQ. To accomplish this, an SQ may be provided that can provide a self-record. In one example, the SQ is divided into a functional segment and a "shadow" segment. The functional segment includes the queue of actual transactions that are to go out to the support circuitry. The shadow segment may include corresponding transactions that are logged for the purpose of providing replayability of the transactions. Note that the transaction logged in the shadow segment need not be the exact same operation as that which went out on the actual queue. For example, when a read is performed from the operational segment of the SQ it may not be necessary or desirable to place the same read operation in the same position in the shadow segment. The read operation does not affect the internal state of the core, so it may be superfluous to a later simulation. Rather, when the read operation is issued from the SQ, a corresponding write operation may be placed in the shadow segment of the SQ, in anticipation that the read from memory will be followed by a write of the resulting data fetched from memory. Thus, once a read transaction is issued, the related entry in the shadow segment of the SQ may be marked as "write 1." A companion write may be marked as "write 2" and allocated on the shadow segment of the SQ. At the end of the transaction flow, write 1 collects the data return 64 bytes into pumps. Write 2 includes the timestamp of the data return and the accumulated responses with its timestamp.

Although outgoing write operations need not be systematically logged, and the data written by those operations need not be logged, an outgoing transaction such as a write may result in a snoop being logged. Snoops and asynchronous events may be captured by associated packets in the IDI ODLAT. The IDI ODLAT is a hardware module located on the IDI bus that monitors traffic of the IDI bus. When a traffic packet matches criteria for the IDI ODLAT, the IDI ODLAT issues a packet including the important attributes of the transactions and timestamps. This packet is sent outbound through a debug trace fabric (DTF). Then, a trace aggregator may be issued out through memory or an external port. IDI ODLAT may not necessarily be a special-purpose component of core-only PSMI. Rather, it may be a generic debug module that may be used for manual debug, triage between core to support circuitry failures, or other purposes. Some of the IDI ODLAT tracing capability may be reassigned to collect technology for core-only PSMI to realize the teachings of the present specification. Note that IDI ODLAT may be particularly used to capture transactions that are not related to the SQ, such as snoops, power management events, and asynchronous events. Asynchronous events may include in some examples capturing of credit occurrences.

The use of the IDI ODLAT in this context provides a less intrusive monitoring of outbound transactions, and the IDI ODLAT may even continue to work when the main flow is blocked, such as in the case of a lock scenario.

Thus, the teachings of the present specification realize an architecture in which heavy inbound traffic is traced through the IDI, such as where 64 bytes of data are returned on the cache line, in which case a corresponding inbound write may be recorded, along with the actual content returned from the cache. Lighter traffic may be traced outbound, or asynchronously, through the IDI ODLAT. This could include snoops, credit, advanced programmable interrupt control (APIC), power management events, or other outbound events.

A system and method for core-only PSMI will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram illustrating selected elements of a debugging architecture according to one or more examples of the present specification.

The debugging architecture of FIG. 1 includes a real system 104 and an emulated system 108. Real system 104 begins in a known state 112, for example a reset state. Note that a reset state is used as a nonlimiting example, and any known state may be used.

Progressing from known state 112, certain processing operations may happen in state 116. These processing operations change the state of the real system. Note that in some examples, real system 104 may be a system that includes both deterministic and nondeterministic components, including a monitored device such as a processing core, and other circuits such as support circuitry that may not be deterministic with respect to the emulation. While processing 116 occurs, a core-only PSMI may collect debugging data and store the data in a debug data structure.

At state 120, real system 104 may encounter an error. (Error term may be extended to any anomaly or unexpected behaviors of the processor.)

Emulated system 108 receives the debug data structure, and starts at a simulated known state 124. Emulated system 108 then progresses through simulated processing 128. Assuming that the simulation is faithful, and that appropriate debugging data have been collected, then the replay of real system 104 results in reproduced error 132. Because reproduced error 132 occurs on an emulated system 108, the system designer may have greater visibility into the processor state, and the state of the logic, thus providing greater opportunity to perform debugging than may be available in real system 104.

Figure 2:
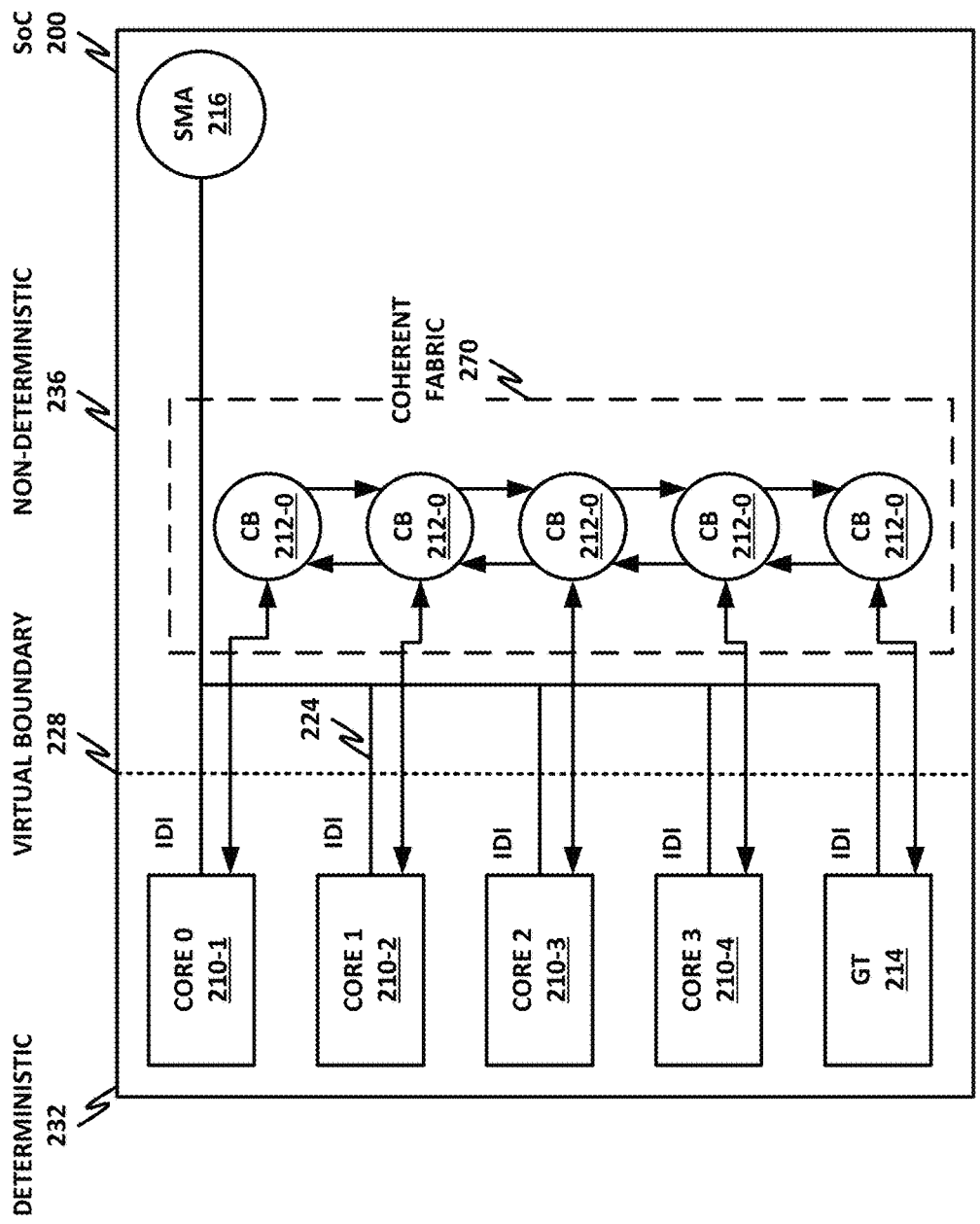
FIG. 2 is a block diagram of a system-on-a-chip, according to one or more examples of the present specification.

FIG. 2 is a block diagram of a system-on-a-chip 200 according to one or more examples of the present specification. In the example of FIG. 2, SoC 200 is divided by a virtual boundary 228 between a deterministic domain 232 and a nondeterministic domain 236. Note that as used here and throughout this specification and the claims, deterministic domain 232 is deterministic in the sense that its logic state can be exactly reconstructed on an accurate clock-by-clock basis with appropriate debugging data. Nondeterministic domain 236 is nondeterministic in the sense that debugging data provided for deterministic domain 232 may not be capable of reconstructing the state of nondeterministic domain 236 on an exact clock-by-clock basis.

Deterministic domain 232 may include, by way of nonlimiting example, certain hard IP blocks such as cores 210, namely core 0 210-1, core 1 210-2, core 2 210-3, and core 3 210-4, and a built-in graphics module GT 214.

Nondeterministic domain 236 may include both hard IP and soft IP blocks that are communicatively coupled to the deterministic block 232 across virtual boundary 228 via, for example, a coherent fabric 270, which is coherent in the sense of cache coherency. Coherent fabric 270 may provide a half-ring architecture.

Nondeterministic domain 236 may include system management agent 216, which may be a system agent and which may provide the core-only PSMI of the present specification. Nondeterministic domain 236 may also include other features not shown, such as a memory controller, a power management unit, a common trace port, a primary fabric, and other support circuitry by way of nonlimiting example.

In an example, debug data structures may be collected for hard IP blocks in deterministic domain 232, such as cores 210 and/or GT 214. To provide successful replay, or in other words the ability to reproduce the collected debug data on an emulator, relevant events are collected deterministically and the clocking is logged accurately. In one example, a crystal clock may be provided that intentionally runs on a frequency that is not a pure multiplier of the reference clock. This may be done to reduce spread spectrum clocking. For example, the crystal clock may run at 19.2 MHz, while the reference clock may run at 100 MHz. However, for successful replay via core-only PSMI, a clock-by-clock deterministic replay must be performed. Thus, the legacy crystal clock may be replaced by a clock that is a pure multiplier of the reference clock. For example, if the reference clock is 100 MHz, the crystal clock may run at 25 MHz. However, the switch to the crystal clock that is a pure multiplier of the reference clock may be done only on the timestamp resources that collect the debug data structure. In the example of FIG. 2, the monitored devices include cores 210 and GT 214. The core may have two timestamp sources, namely the timestamp counter (TSC, or the core official timestamp located at APIC), and the IDI ODLAT timestamp located at the IDI ODLAT.

As illustrated in this FIGURE, by way of nonlimiting example, core timestamps may be switched to a pure multiplier such as 25 MHz in the collect and replay mode. However, the rest of SoC 200, such as devices and circuits within nondeterministic domain 236 may still run at the original crystal clock frequency, such as a non-multiplier like 19.2 MHz. The use of a deterministic clock only within deterministic domain 232, while leaving nondeterministic domain 236 alone, optimizes the probability of a successful replay. The timestamp during a collect and replay mode may be provided in the core clock, thus allowing the transactor on the emulator to successfully replay the scenario. Note that in other embodiments, non-multiple block methods may be utilized to replay the domain in a deterministic way.

In another embodiment, IDI ODLAT may be used to capture asynchronous events. In some embodiments, a device such as GT 214 may lack the IDI ODLAT of core 210, and thus may store asynchronous events in P6 static random-access memory (SRAM). This allows the capture of asynchronous events in addition to synchronous events.

Figure 3:
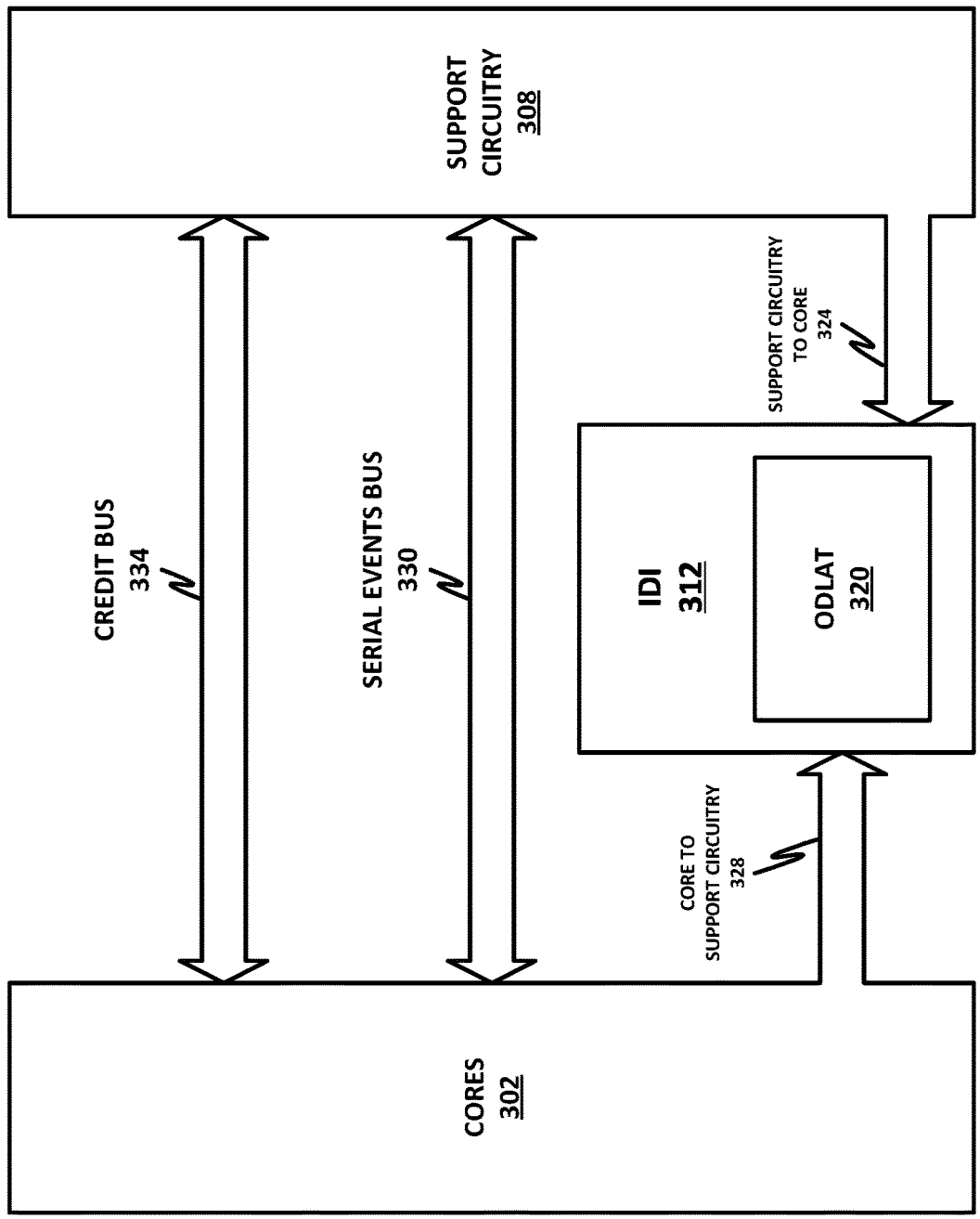
FIG. 3 is a block diagram illustrating transactions between cores and support circuitry in a system, such as a system-on-a-chip, according to one or more examples of the present specification.

FIG. 3 is a block diagram illustrating transactions between cores 302 and support circuitry 308 in a system, such as a system-on-a-chip as illustrated in FIG. 2. In this example, cores 302 may communicate via IDI 312 for large synchronous transactions, such as reads from a cache line. IDI 312 may include a core to support circuitry bus 328, and a support circuitry to core bus 324. IDI 312 may also include an ODLAT 320.

Other buses may be provided, and may track other transactions, including asynchronous transactions. These can include, by way of nonlimiting example, a serial events bus 330, which may be used to track asynchronous transactions, as well as a credit bus 334, which may be used to exchange credits in a timing scheme.

Figure 4:
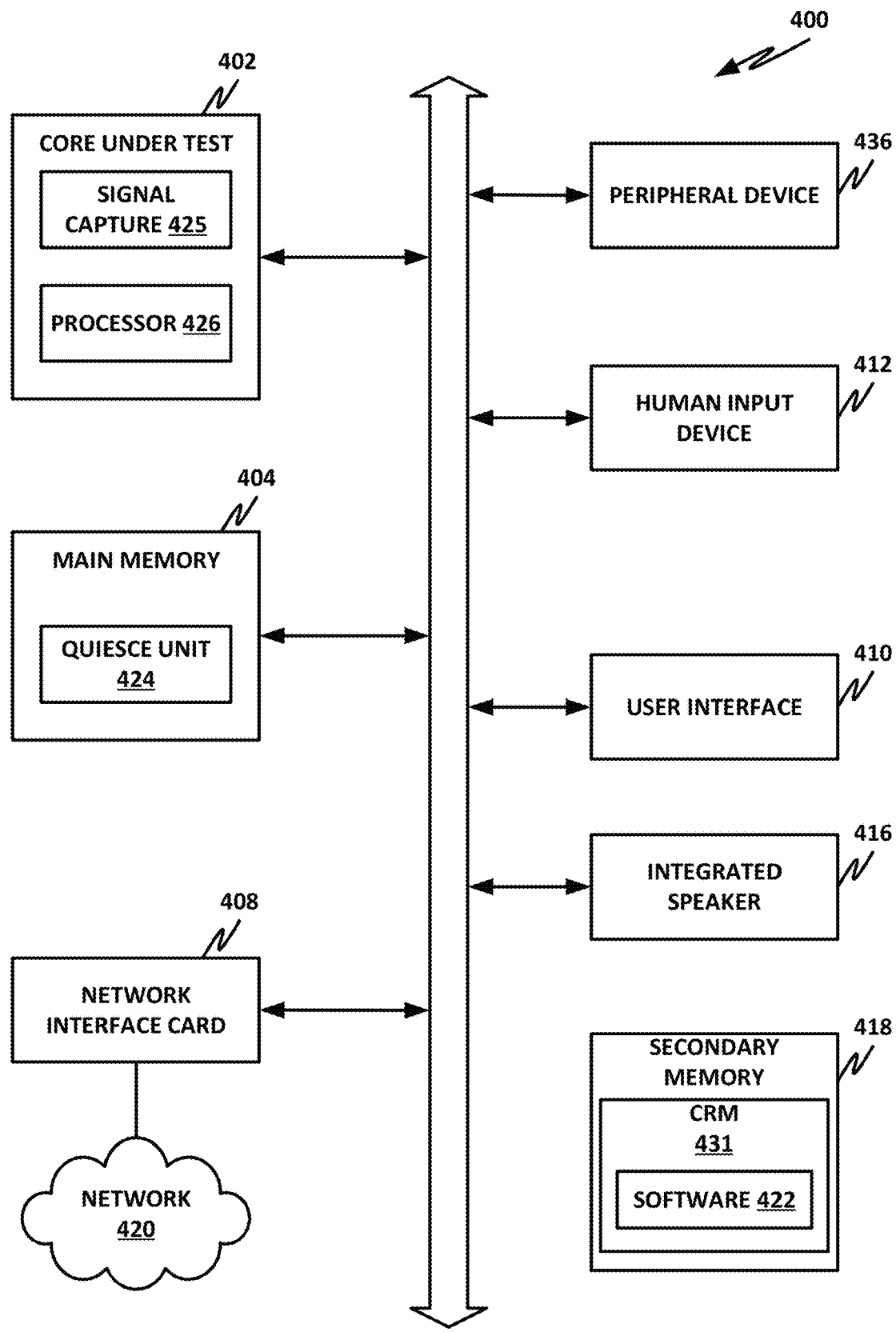
FIG. 4 is a block diagram of a system having one or more cores under test according to one or more examples of the present specification.

FIG. 4 is a block diagram of a system 400 having one or more cores under test 402 according to one or more examples of the present specification. System 400 includes a core under test 402, a main memory 404 (for example, a read only memory (ROM) or dynamic random access memory (DRAM) such as synchronous DRAM (SDRAM) or Rambus DRAM (RDRAM)), static memory such as flash memory, static random access memory (SRAM), volatile high data rate RAM, or similar, and a secondary memory 418 (for example, a persistent storage device including a hard disk drive or a persistent fast memory such as Intel® 3-D Crosspoint), which communicate with each other via a bus 430. Main memory 404 includes a quiesce unit 424 to trigger and coordinate a quiesce phase within core under test 402. Core under test 402 operates in conjunction with processor 426 to perform methods disclosed herein. In one embodiment, core under test 402 utilizes a signal capture 425 internal to core under test 402 to capture input signals.

System 400 may also include a network interface card 408. System 400 also may include a user interface 410 (such as a display unit) and may provide a human input device 412, which may include for example a keyboard, an alphanumeric device, a mouse, or similar. System 400 may include a signal generation device 416, such as an integrated speaker. System 400 may also include a peripheral device 436 (for example, wireless or wired communication devices, memory devices, storage devices, auto processing devices, video processing devices, or similar).

Secondary memory 418 may include a non-transitory computer readable medium 431, on which may be stored one or more sets of instructions (for example, software 422), embodying one or more methods or functions as illustrated herein. Software 422 may also reside, completely or partially, within main memory 404 and/or within core under test 402 during execution by system 400. Software 422 may also be transmitted or received over a network 420 via network interface card 408.

Figure 5:
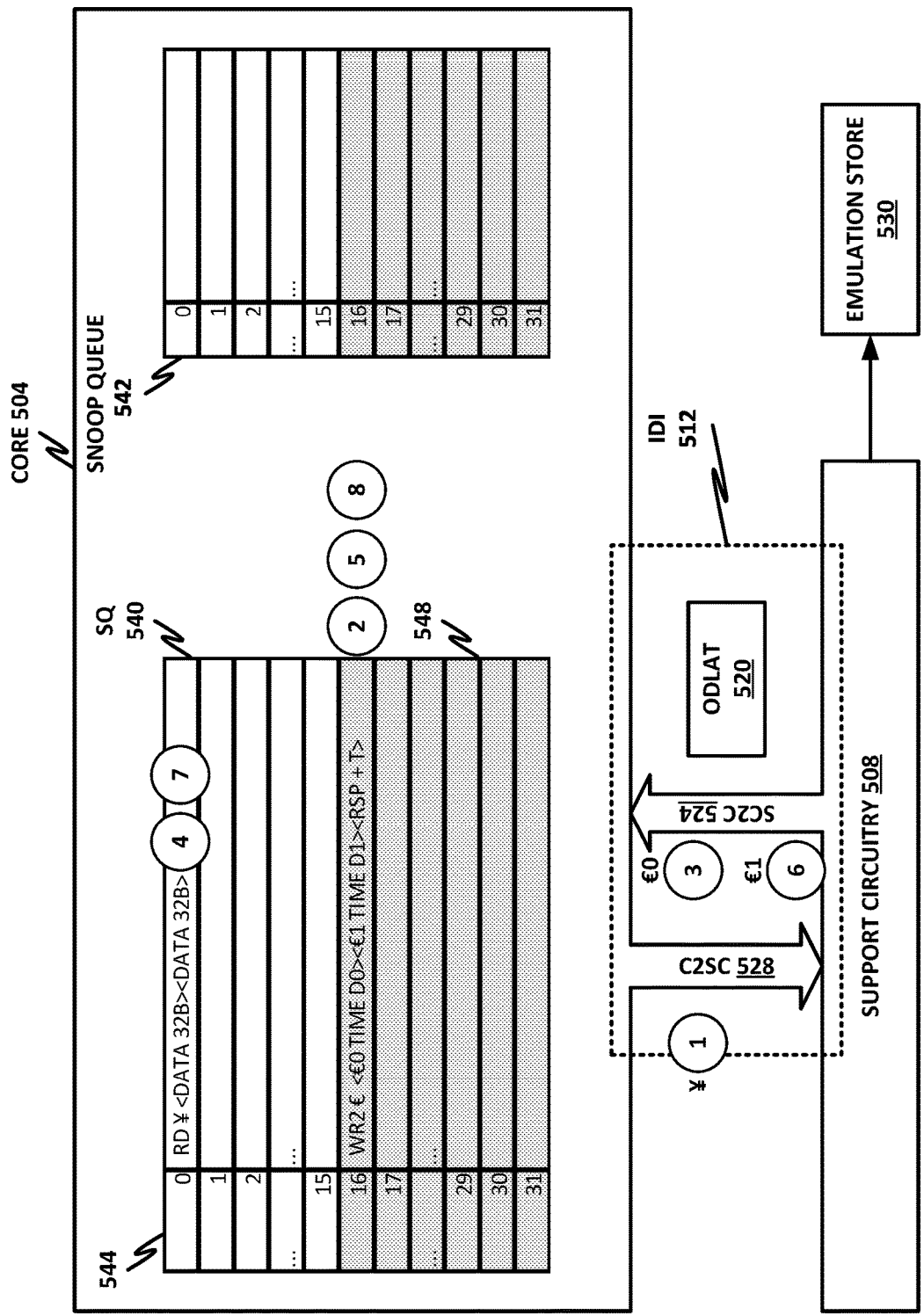
FIGS. 5-7 include block diagrams illustrating one or more methods of logging debug data according to one or more examples of the present specification.
Figure 6:
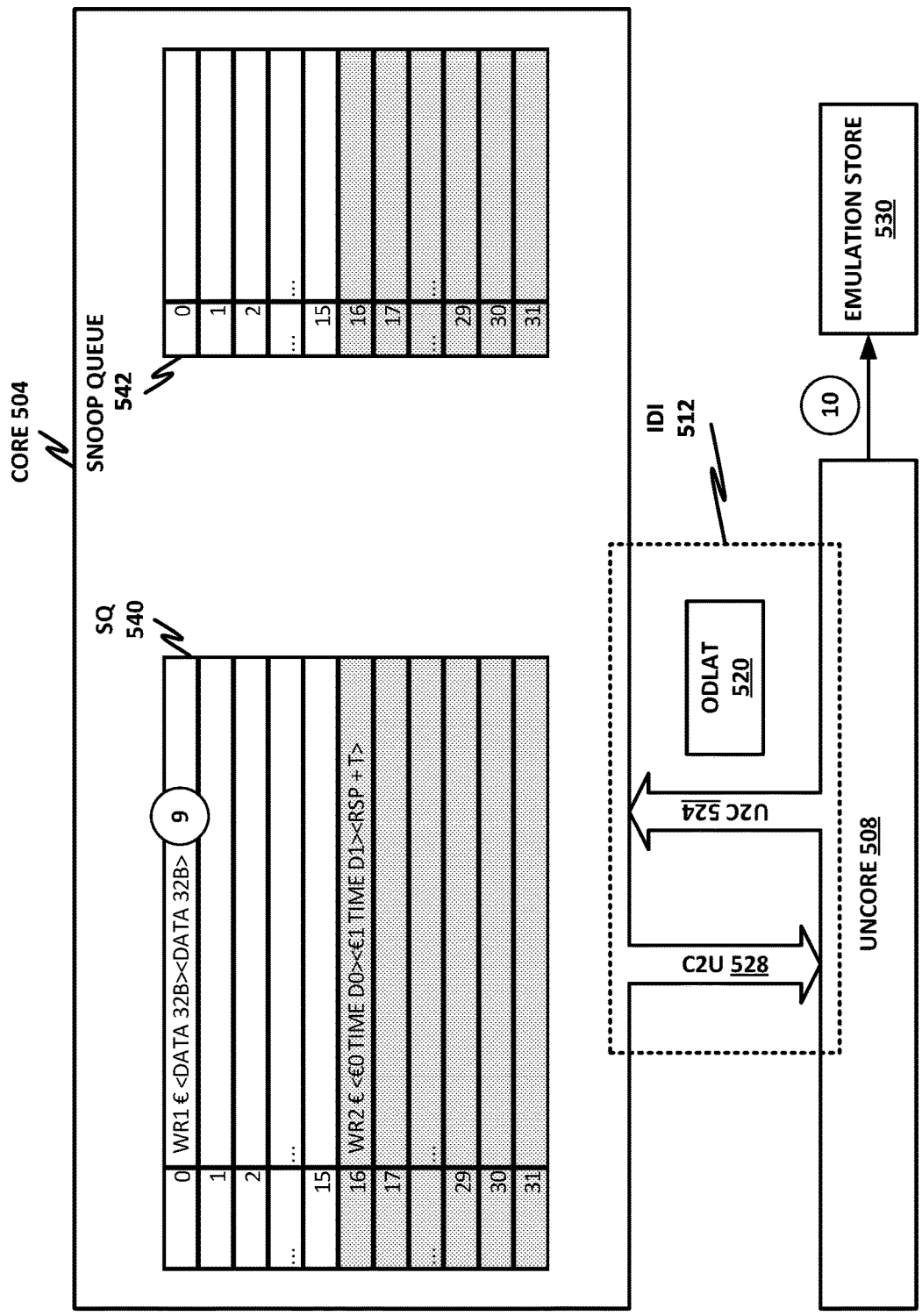
Figure 7:
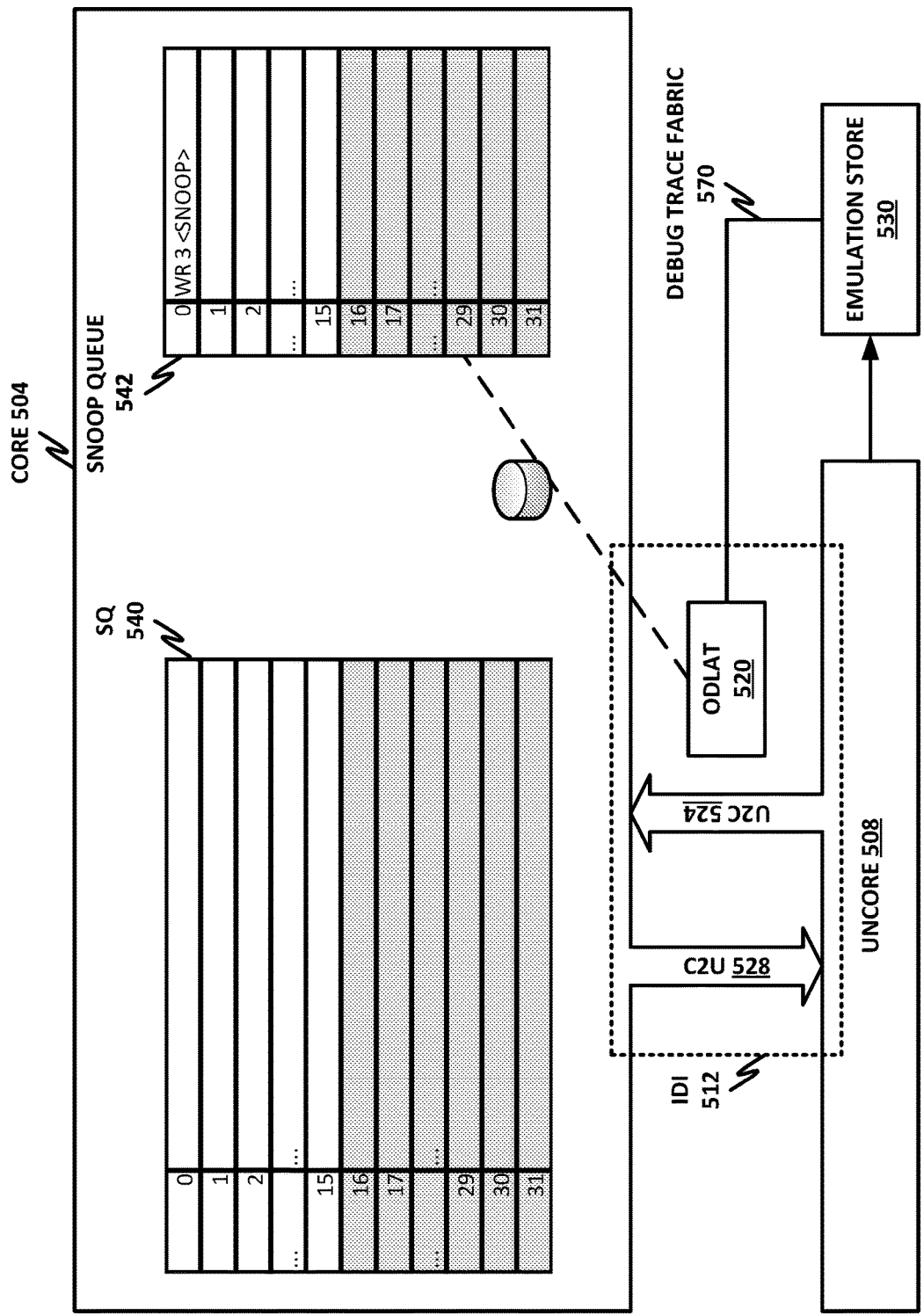

FIGS. 5-7 include block diagrams illustrating one or more methods of logging debug data according to one or more examples of the present specification. In these FIGURES, a core 504 includes a super queue (SQ) 540 as well as a snoop queue 542. Core 504 may exist on a system-on-a-chip with support circuitry 508. As illustrated herein, core 504 may be any deterministic domain for emulation purposes, while support circuitry 508 is any nondeterministic domain. Core 504 communicates with support circuitry 508 via IDI 512, which includes support circuitry to core 524 and core to support circuitry buses 528. IDI 512 also includes an IDI ODLAT 520. A system management agent operating on support circuitry 508 may collect debug data that enables replay of operations on core 504, and may store them on emulation store 530. Emulation store 530 may be configured to hold a debug data structure that can be used for replay on an emulator as illustrated herein.

Several operations are illustrated over the course of FIGS. 5, 6, and 7, and are illustrated in a particular order for purposes of illustration. The order of operations should be understood to be nonlimiting, and is disclosed only to aid in understanding of the operations.

As discussed herein, SQ 540 is a 32-element queue that is configured to queue transactions between core 504 and support circuitry 508. For example, in the illustrated embodiment, the current highest priority position within SQ 540 is occupied by a read operation represented by a first symbol, wherein the read operation may be, for example, a read from the cache line. This may result in a 64-byte data read, which may be written to register files within core 504.

At operation 1, core 504 issues the read operation to uncore 508 via C2U bus 520.

The read operation is an outbound operation that may not need to be preserved to ensure replayability of core 504.

In this example, SQ 540 is divided into two regions, namely a first operational region 544, and a second shadow region 548. Operational region 544 is the region that provides actual operations to support circuitry 508. Shadow region 548 includes corresponding blog entries, that need not provide a one-to-one correlation with operational region 544. The read request is not captured, since it is an output from the deterministic domain, and may be generated by the emulator during replay.

At operation 2, when core 504 issues a read, SQ 540 stores a corresponding transaction write-to, represented by a second symbol, in shadow segment 548 of SQ 540. Write-to is stored in anticipation that the read will result in a corresponding write-back to core 504.

Because IDI 512 is 32 bytes wide, the read from cache which is 64 bytes is returned in two stages. At operation 3, write 0 is returned via UTC bus 524.

At operation four, the data returned are written to entry 0 in SQ 540.

At operation 5, a corresponding entry is written to shadow segment 548, including a timestamp D0 for the write 0.

At operation 6, write 1 is returned via UTC 524.

At operation 7, the returned data are stored in entry 0 of SQ 540, again being 32 bytes wide.

At operation 8, a timestamp D1 is also stored for write 1 in shadow segment 548. Finally, a response with an appropriate timestamp may also be stored in shadow segment 548, thus creating a complete transactional record of the write that resulted from the initial read. Note that the read itself may not need to be logged to re-create or replay the transaction. Rather, during the replay, the corresponding read may be generated internally to the emulator.

Turning to FIG. 6, at operation 9, the data returned are consumed by the original transaction. The read command has been transformed to a write, while the payload of the write is the same data that were previously returned by the read. Write 1 is written to a specially preallocated debug region in memory. Write 2 follows write 1 and is written to the same preallocated debug region, such as emulation store 530. Write 1 includes the timestamp of the data returned and the timestamp of the response and its type. In this example, write 1 may have an even address, and write 1 is written only to the even address for ease of decoding a valid trace. Note that when the transaction does not include data (such as a write) then there may be nonvolatiles in trace memory.

Write 2 may have an odd address. Write 2 may be written only to odd addresses, and may also include a valid data bit indicating that its associated even address does indeed include valid data.

FIG. 7 illustrates logging of snoops and asynchronous events via ODLAT 520.

Snoops and asynchronous events may be captured by an associated packet in IDI ODLAT 520. IDI ODLAT 520 may be a hardware module located on IDI core to SoC bus 512 that monitors the traffic of IDI 512. IDI ODLAT 520 may match appropriate traffic and when traffic is matched, IDI ODLAT 520 issues a packet including the important attributes of the transaction and the timestamp.

The packet may be sent outbound via a special debug bus called debug trace fabric 570. Once DTF 570 issues the packet, a trace aggregator may issue it out through memory or an external port.

IDI ODLAT 520 may be used to capture transactions that are not related to SQ 540, such as snoops and APIC. Snoops may be stored on a separate snoop queue 542.

IDI ODLAT 520 may also be used for capturing asynchronous events such as credit occurrences, power management, and similar. Advantageously, IDI ODLAT is less intrusive to the main flow, and may work when the main flow is blocked, such as via a lock scenario.

By capturing heavy inbound transactions, as well as asynchronous transactions in snoops, an emulator may be able to use data in emulation store 530 to accurately reproduce the state of core 504.

Note that in the preceding figures, outbound transactions are not captured. However, in one embodiment, there may be some value in opportunistically or periodically capturing outbound transactions. In this case, opportunistic capturing may be capturing when there is spare capacity, or when the bus is not busy. Periodic capturing may be capturing on a regular schedule, or some combination of opportunistic and periodic capturing.

A value in opportunistically or periodically capturing outbound transactions is that these may be used to provide synchronization. For example, it may be desirable to periodically compare outbound transactions that are logged to outbound transactions being generated internally within the emulator. If the outbound transactions match, then the designer can have confidence that the simulation is accurately matching the real core 504. If the emulator gets out of sync with core 504, then the system designer may be able to determine that some error has occurred, or that there is some misconfiguration in the emulator itself or in the debug data structure. Thus, opportunistic or periodic capturing of outbound transactions may provide useful synchronization features.

Certain of the figures below detail example architectures and systems to implement embodiments of the above. In some embodiments, one or more hardware components and/or instructions described above are emulated as detailed below, or implemented as software modules.

In certain examples, instruction(s) may be embodied in a "generic vector-friendly instruction format," which is detailed below. In other embodiments, another instruction format is used. The description below of the write mask registers, various data transformations (swizzle, broadcast, etc.), addressing, etc. is generally applicable to the description of the embodiments of the instruction(s) above. Additionally, example systems, architectures, and pipelines are detailed below. Embodiments of the instruction(s) above may be executed on those systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are fewer fields included) and/or defined to have a given field interpreted differently. Thus, each instruction of an ISA is expressed using a given instruction format (and, if defined, in a given one of the instruction templates of that instruction format) and includes fields for specifying the operation and the operands. In one embodiment, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the advanced vector extensions (AVXs) (AVX1 and AVX2), and using the vector extensions (VEX) coding scheme has been released and/or published (e.g., see Intel® 64 and IA-32 Architectures Software Developer's Manual, September 9014; and see Intel® Advanced Vector Extensions Programming Reference, October 9014).

Example Instruction Formats

Embodiments of the instruction(s) described herein may be embodied in different formats. Additionally, example systems, architectures, and pipelines are detailed below. Embodiments of the instruction(s) may be executed on such systems, architectures, and pipelines, but are not limited to those detailed.

Generic Vector-Friendly Instruction Format

A vector-friendly instruction format is an instruction format that is suited for vector instructions (e.g., there are certain fields specific to vector operations). While embodiments are described in which both vector and scalar operations are supported through the vector-friendly instruction format, alternative embodiments use only vector operations through the vector-friendly instruction format.

FIGS. 8a-8b are block diagrams illustrating a generic vector-friendly instruction format and instruction templates thereof according to embodiments of the specification. FIG. 8a is a block diagram illustrating a generic vector-friendly instruction format and class A instruction templates thereof according to embodiments of the specification; while FIG. 8b is a block diagram illustrating the generic vector-friendly instruction format and class B instruction templates thereof according to embodiments of the specification. Specifically, a generic vector-friendly instruction format 800 for which are defined class A and class B instruction templates, both of which include no memory access 805 instruction templates and memory access 820 instruction templates. The term generic in the context of the vector-friendly instruction format refers to the instruction format not being tied to any specific instruction set.

Embodiments of the specification will be described in which the vector-friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 956 byte vector operands) with more, less, or different data element widths (e.g., 828 bit (16 byte) data element widths).

The class A instruction templates in FIG. 8a include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, nontemporal 830 instruction template. The class B instruction templates in FIG. 8b include: 1) within the no memory access 805 instruction templates there is shown a no memory access, write mask control, partial round control type operation 812 instruction template and a no memory access, write mask control, VSIZE type operation 817 instruction template; and 2) within the memory access 820 instruction templates there is shown a memory access, write mask control 827 instruction template.

The generic vector-friendly instruction format 800 includes the following fields listed below in the order illustrated in FIGS. 1a-1b.

Format field 840—a specific value (an instruction format identifier value) in this field uniquely identifies the vector-friendly instruction format, and thus occurrences of instructions in the vector-friendly instruction format in instruction streams. As such, this field is optional in the sense that it is not needed for an instruction set that has only the generic vector-friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a P×Q (e.g. 32×1212, 16×828, 32×8024, 64×8024) register file. While in one embodiment N may be up to three sources and one destination register, alternative embodiments may support more or fewer sources and destination registers (e.g., may support up to two sources where one of these sources also acts as the destination, may support up to three sources where one of these sources also acts as the destination, or may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, fewer, or different ways to perform memory address calculations.

Augmentation operation field 850—its content distinguishes which one of a variety of different operations to be performed in addition to the base operation. This field is context specific. In one embodiment of the specification, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}$*index+base).

Displacement Field 862A—its content is used as part of memory address generation (e.g., for address generation that uses $2^{scale}$*index+base+displacement).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operand's total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments, for all instructions; in other embodiments, for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-write masking, while class B instruction templates support both merging and zeroing-write masking. When merging, vector masks allow any set of elements in the destination to be protected from updates during the execution of any operation (specified by the base operation and the augmentation operation)—in one embodiment, preserving the old value of each element of the destination where the corresponding mask bit has a 0. In contrast, when zeroing vector masks allow any set of elements in the destination to be zeroed during the execution of any operation (specified by the base operation and the augmentation operation), in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the specification are described in which the write mask field's 870 content selects one of a number of write mask registers that contains the write mask to be used (and thus the write mask field's 870 content indirectly identifies that masking to be performed), alternative embodiments instead or additionally allow the mask write field's 870 content to directly specify the masking to be performed.

Immediate field 872—its content allows for the specification of an immediate. This field is optional in the sense that is it not present in an implementation of the generic vector-friendly format that does not support immediate and it is not present in instructions that do not use an immediate.

Class field 868—its content distinguishes between different classes of instructions. With reference to FIGS. 1a-1b, the contents of this field select between class A and class B instructions. In FIGS. 1a-1b, rounded corner squares are used to indicate a specific value is present in a field (e.g., class A 868A and class B 868B for the class field 868 respectively in FIGS. 1a-1b).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content provides static rounding. While in the described embodiments of the specification the round control field 854A includes a suppress all floating point exceptions (SAE) field 856 and a round operation control field 858, alternative embodiments may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating point exception handler.

Round operation control field 858—its content distinguishes which one of a group of rounding operations to perform (e.g., round-up, round-down, round-towards-zero and round-to-nearest). Thus, the round operation control field 858 allows for the changing of the rounding mode on a per instruction basis. In one embodiment of the specification where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8a, temporal 852B.1 and nontemporal 852B.2 are respectively specified for the memory access, temporal 825 instruction template and the memory access, nontemporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred as dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Nontemporal

Nontemporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale field 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating point exception handler).

Round operation control field 859A—just as round operation control field 858, its content distinguishes which one of a group of rounding operations to perform (e.g., round-up, round-down, round-towards-zero and round-to-nearest). Thus, the round operation control field 859A allows for the changing of the rounding mode on a per instruction basis. In one embodiment of the specification where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 828, 956, or 1212 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted by the vector length field 859B. The memory access 820 instruction templates include the scale field 860, and optionally the displacement field 862A or the displacement scale field 862B.

With regard to the generic vector-friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector-friendly instruction format.

The combination of write mask field and data element width field create typed instructions in that they allow the mask to be applied based on different data element widths.

The various instruction templates found within class A and class B are beneficial in different situations. In some embodiments of the specification, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the specification). Also, a single processor may include multiple cores, all of which support the same class or in which different cores support different classes. For instance, in a processor with separate graphics and general purpose cores, one of the graphics cores intended primarily for graphics and/or scientific computing may support only class A, while one or more of the general purpose cores may be high performance general purpose cores with out-of-order execution and register renaming intended for general-purpose computing that supports only class B. Another processor that does not have a separate graphics core may include one more general purpose in-order or out-of-order cores that support both class A and class B. Of course, features from one class may also be implemented in the other class in different embodiments of the specification. Programs written in a high level language would be put (e.g., just in time compiled or statically compiled) into an variety of different executable forms, including: 1) a form having only instructions of the class or classes supported by the target processor for execution; or 2) a form having alternative routines written using different combinations of the instructions of all classes and having control flow code that selects the routines to execute based on the instructions supported by the processor which is currently executing the code.

Example Specific Vector-Friendly Instruction Format

FIGS. 9a-9d are block diagrams illustrating an example specific vector-friendly instruction format according to embodiments of the specification. FIGS. 9a-9d show a specific vector-friendly instruction format 900 that is specific in the sense that it specifies the location, size, interpretation, and order of the fields, as well as values for some of those fields. The specific vector-friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIGS. 8a and 8b into which the fields from FIGS. 9a-9d map are illustrated.

It should be understood that, although embodiments of the specification are described with reference to the specific vector-friendly instruction format 900 in the context of the generic vector-friendly instruction format 800 for illustrative purposes, the present specification is not limited to the specific vector-friendly instruction format 900 except where claimed. For example, the generic vector-friendly instruction format 800 contemplates a variety of possible sizes for the various fields, while the specific vector-friendly instruction format 900 is shown as having fields of specific sizes. By way of particular example, while the data element width field 864 is illustrated as a one bit field in the specific vector-friendly instruction format 900, the present specification is not so limited (that is, the generic vector-friendly instruction format 800 contemplates other sizes of the data element width field 864).

The generic vector-friendly instruction format 800 includes the following fields listed below in the order illustrated in FIG. 9a.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0x62 (the unique value used for distinguishing the vector-friendly instruction format in one embodiment).

The second through fourth bytes (EVEX Bytes 1-3) include a number of bit fields providing specific capability.

REX field 905 (EVEX Byte 1, bits [7-5])—consists of an EVEX.R bit field (EVEX Byte 1, bit [7]—R), EVEX.X bit field (EVEX byte 1, bit [6]—X), and 857BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 8111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 810—this is the first part of the REX' field 810 and is the EVEX.R' bit field (EVEX Byte 1, bit [4]—R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD RIM field (described below) the value of 11 in the MOD field; other embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]—mmmm)—its content encodes an implied leading opcode byte (0F, 0F 38, or 0F 3).

Data element width field 864 (EVEX byte 2, bit [7]—W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 8111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.U 868 Class field (EVEX byte 2, bit [2]—U)—if EVEX.U=0, it indicates class A or EVEX.U0; if EVEX.U=1, it indicates class B or EVEX.U1.

Prefix encoding field 925 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use an SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit [7]—EH; also known as EVEX.eh, EVEX.rs, EVEX.rl, EVEX.write mask control, and EVEX.n; also illustrated with α)—as previously described, this field is context specific.

Beta field 854 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 810—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]—kkk)—its content specifies the index of a register in the write mask registers as previously described. In one embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand, or be treated as an opcode extension and not used to encode any instruction operand. The role of R/M field 946 may include the following: encoding the instruction operand that references a memory address, or encoding either the destination register operand or a source register operand.

Scale, Index, Base (SIB) Byte (Byte 6)—as previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is the same as that of the legacy x86 instruction set 8-bit displacement (disp8), which works at byte granularity. Since disp8 is sign extended, it can only address between 828 and 827-byte offsets; in terms of 64 byte cache lines, disp8 uses 8 bits that can be set to only four really useful values –828, –64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte used for the displacement but with a much greater range). Such compressed displacement is based on the assumption that the effective displacement is a multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

Figure 9B:
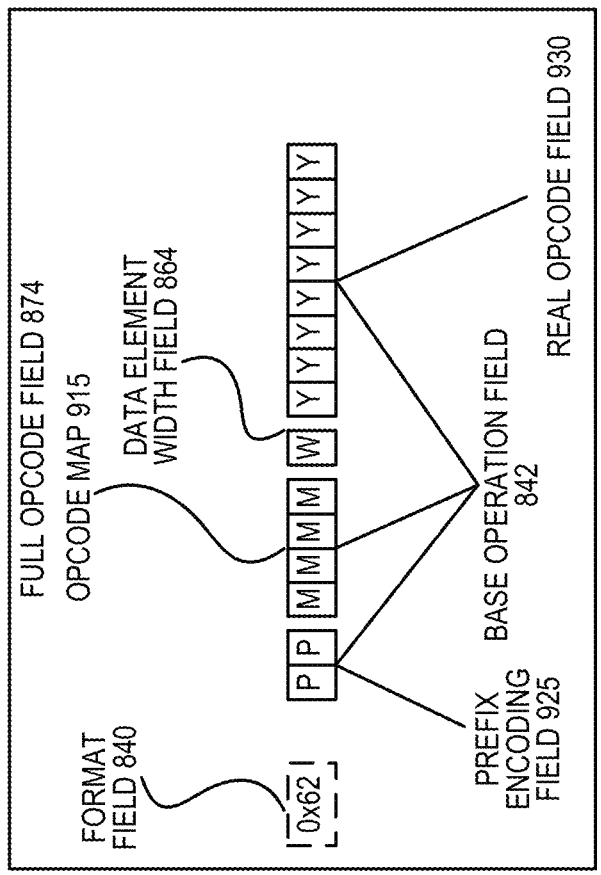

FIG. 9b is a block diagram illustrating the fields of the specific vector-friendly instruction format 900 that make up the full opcode field 874 according to one embodiment. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

Figure 9C:
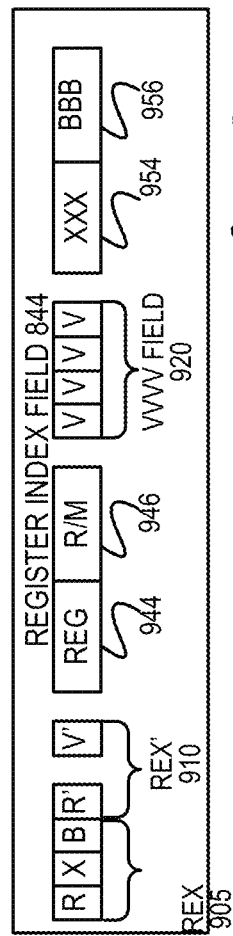

FIG. 9c is a block diagram illustrating the fields of the specific vector-friendly instruction format 900 that make up the register index field 844 according to one embodiment. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
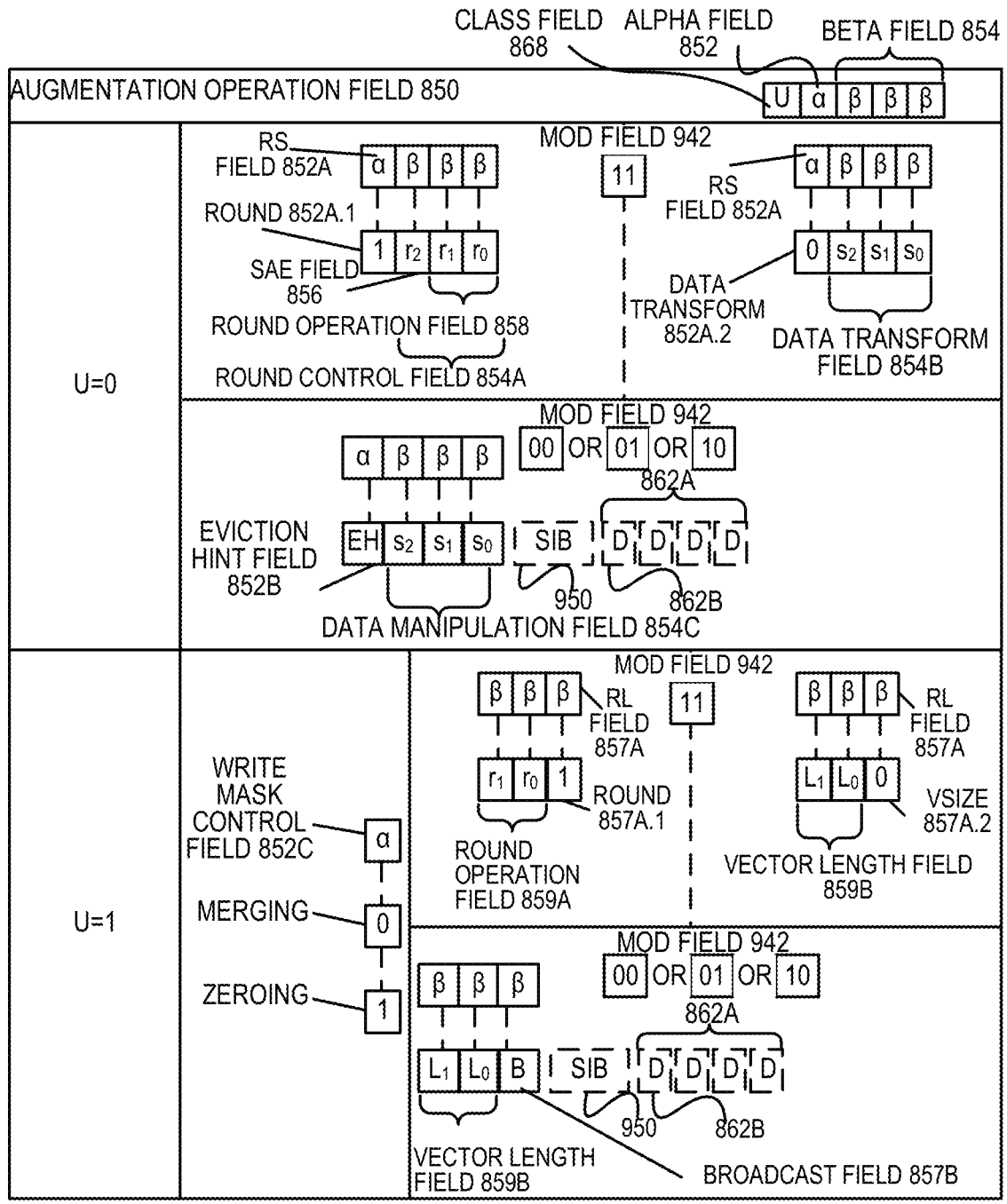

FIG. 9d is a block diagram illustrating the fields of the specific vector-friendly instruction format 900 that make up the augmentation operation field 850 according to one embodiment. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]—EH) is interpreted as the rs field 852A. When the rs field 852A contains a 1 (round 852A.1), the beta field 854 (EVEX byte 3, bits [6:4]—SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]—SSS) is interpreted as a three bit data transform field 854B. When U=0 and the MOD field 942 contains 00, 01, or 10 (signifying a memory access operation), the alpha field 852 (EVEX byte 3, bit [7]—EH) is interpreted as the eviction hint (EH) field 852B and the beta field 854 (EVEX byte 3, bits [6:4]—SSS) is interpreted as a three bit data manipulation field 854C.

When U=1, the alpha field 852 (EVEX byte 3, bit [7]—EH) is interpreted as the write mask control (Z) field 852C. When U=1 and the MOD field 942 contains 11 (signifying a no memory access operation), part of the beta field 854 (EVEX byte 3, bit [4]—$S_0$) is interpreted as the RL field 857A; when it contains a 1 (round 857A.1) the rest of the beta field 854 (EVEX byte 3, bit [6-5]—$S_{2-1}$) is interpreted as the round operation field 859A, while when the RL field 857A contains a 0 (VSIZE 857.A2) the rest of the beta field 854 (EVEX byte 3, bit [6-5]—$S_{2-1}$) is interpreted as the vector length field 859B (EVEX byte 3, bit [6-5]—$L_{1-0}$). When U=1 and the MOD field 942 contains 00, 01, or 10 (signifying a memory access operation), the beta field 854 (EVEX byte 3, bits [6:4]—SSS) is interpreted as the vector length field 859B (EVEX byte 3, bit [6-5]—$L_{1-0}$) and the broadcast field 857B (EVEX byte 3, bit [4]—B).

Example Register Architecture

Figure 10:
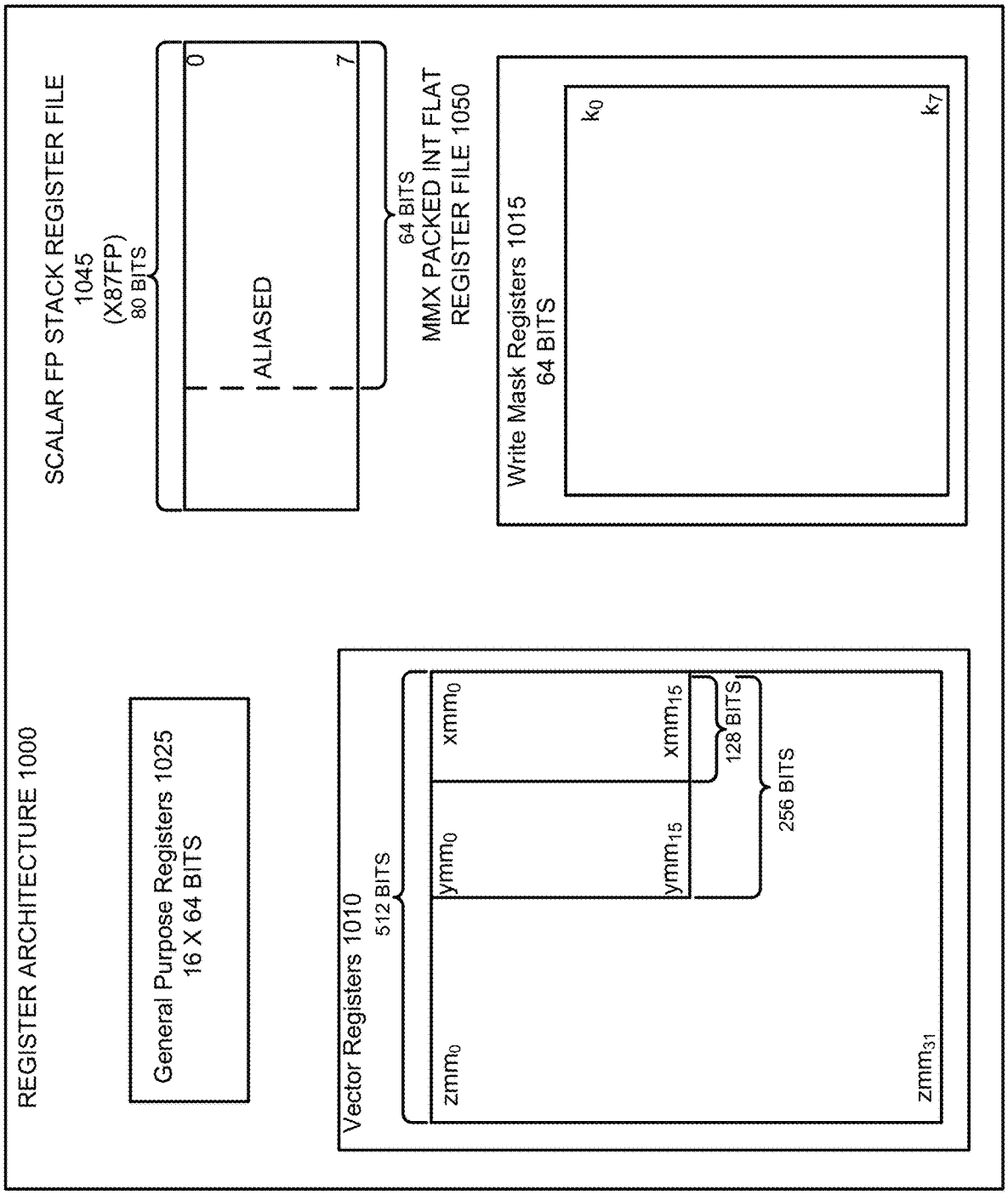
FIG. 10 is a block diagram of a register architecture according to one or more examples of the present specification.

FIG. 10 is a block diagram of a register architecture 1000 according to one embodiment. In the embodiment illustrated, there are 32 vector registers 1010 that are 1212 bits wide; these registers are referenced as zmm0 through zmm31. The lower order 956 bits of the lower 16 zmm registers are overlaid on registers ymm0-16. The lower order 828 bits of the lower 16 zmm registers (the lower order 828 bits of the ymm registers) are overlaid on registers xmm0-15. The specific vector-friendly instruction format 900 operates on these overlaid register files as illustrated in the below tables.

| Adjustable Vector Length | Class | Operations | Registers |
| --- | --- | --- | --- |
| Instruction Templates that do not include the vector length field 859B | A (FIG. 8a; U = 0) | 810, 815, 825, 830 | zmm registers (the vector length is 64 byte) |
| | B (FIG. 8b; U = 1) | 812 | zmm registers (the vector length is 64 byte) |

-continued

| Adjustable Vector Length | Class | Operations | Registers |
|---|---|---|---|
| Instruction templates that do include the vector length field 859B | B (FIG. 8b; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instruction templates without the vector length field 859B operate on the maximum vector length. Further, in one embodiment, the class B instruction templates of the specific vector-friendly instruction format 900 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Other embodiments may use wider or narrower registers. Additionally, other embodiments may use more, less, or different register files and registers.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific throughput. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Example Core Architectures

In-Order and Out-of-Order Core Block Diagram

FIG. 11a is a block diagram illustrating both an example in-order pipeline and an example register renaming, out-of-order issue/execution pipeline. FIG. 11b is a block diagram illustrating both an embodiment of an in-order architecture core and an example register renaming, out-of-order issue/execution architecture core to be included in a processor. The solid lined boxes in FIGS. 11a-11b illustrate the in-order pipeline and in-order core, while the optional addition of the dashed, lined boxes illustrates the register renaming, out-of-order issue/execution pipeline and core. Given that the in-order aspect is a subset of the out-of-order aspect, the out-of-order aspect will be described.

In FIG. 11a, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11b shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservation stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 performs the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instruction sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Example In-Order Core Architecture

FIGS. 12a-12b illustrate a block diagram of a more specific example in-order core architecture, which core would be one of several logic blocks (including other cores of the same type and/or different types) in a chip. The logic blocks communicate through a high-bandwidth interconnect network (e.g., a ring network) with some fixed function logic, memory IO interfaces, and other necessary IO logic, depending on the application.

FIG. 12a is a block diagram of a single processor core, along with its connection to the on-die interconnect network 1202 and with its local subset of the Level 2 (L2) cache 1204, according to one or more embodiments. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, other embodiments may use a different approach (e.g., use a single register set or include a communication path that allows data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 8012-bits wide per direction.

FIG. 12b is an expanded view of part of the processor core in FIG. 12a according to embodiments of the specification. FIG. 12b includes an L1 data cache 1206A, part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

FIG. 13 is a block diagram of a processor 1300 that may have more than one core, may have an integrated memory controller, and may have integrated graphics according to embodiments of the specification. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific throughput; and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308, the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302A-N.

In some embodiments, one or more of the cores 1302A-N are capable of multi-threading. The system agent 1310 includes those components coordinating and operating cores 1302A-N. The system agent unit 1310 may include, for example, a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of executing the same instruction set, while others may be capable of executing only a subset of that instruction set or a different instruction set.

Example Computer Architectures

FIGS. 14-17 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
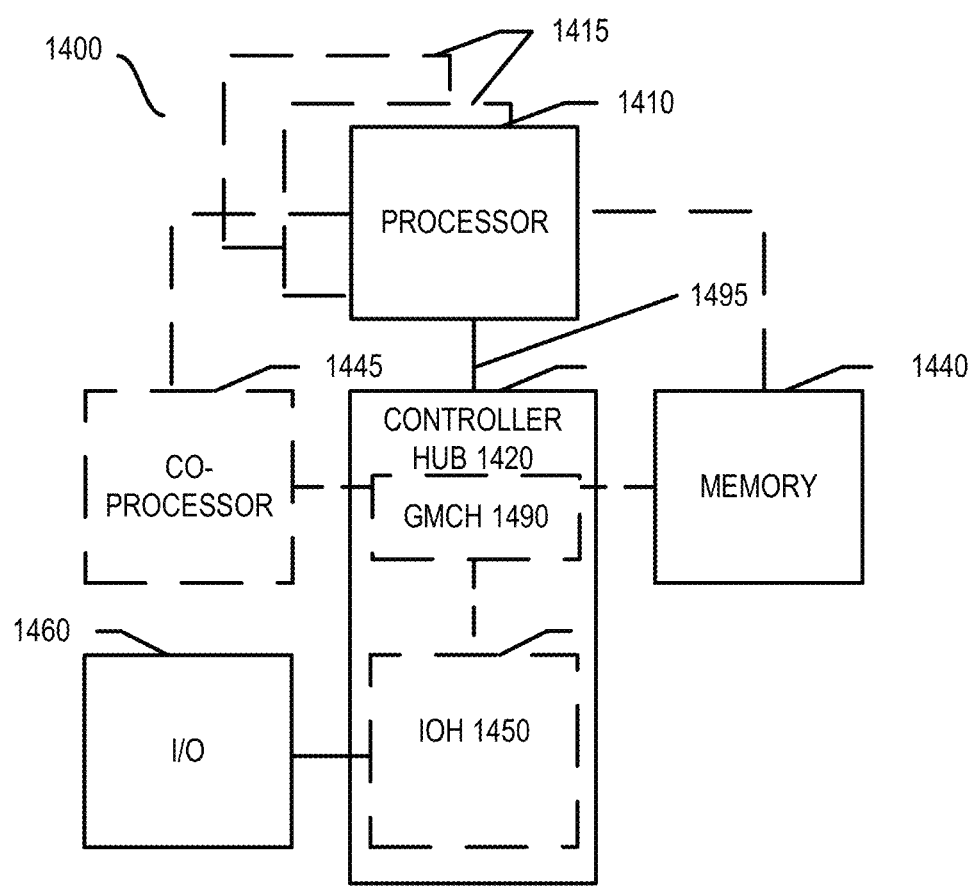
FIGS. 14-17 are block diagrams of computer architectures according to one or more examples of the present specification.

Referring now to FIG. 14, shown is a block diagram of a system 1400 in accordance with one embodiment. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 couples input/output (IO) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multidrop bus, such as a frontside bus (FSB), point-to-point interface such as Ultra Path Interconnect (UPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accepts and executes the received coprocessor instructions.

Figure 15:
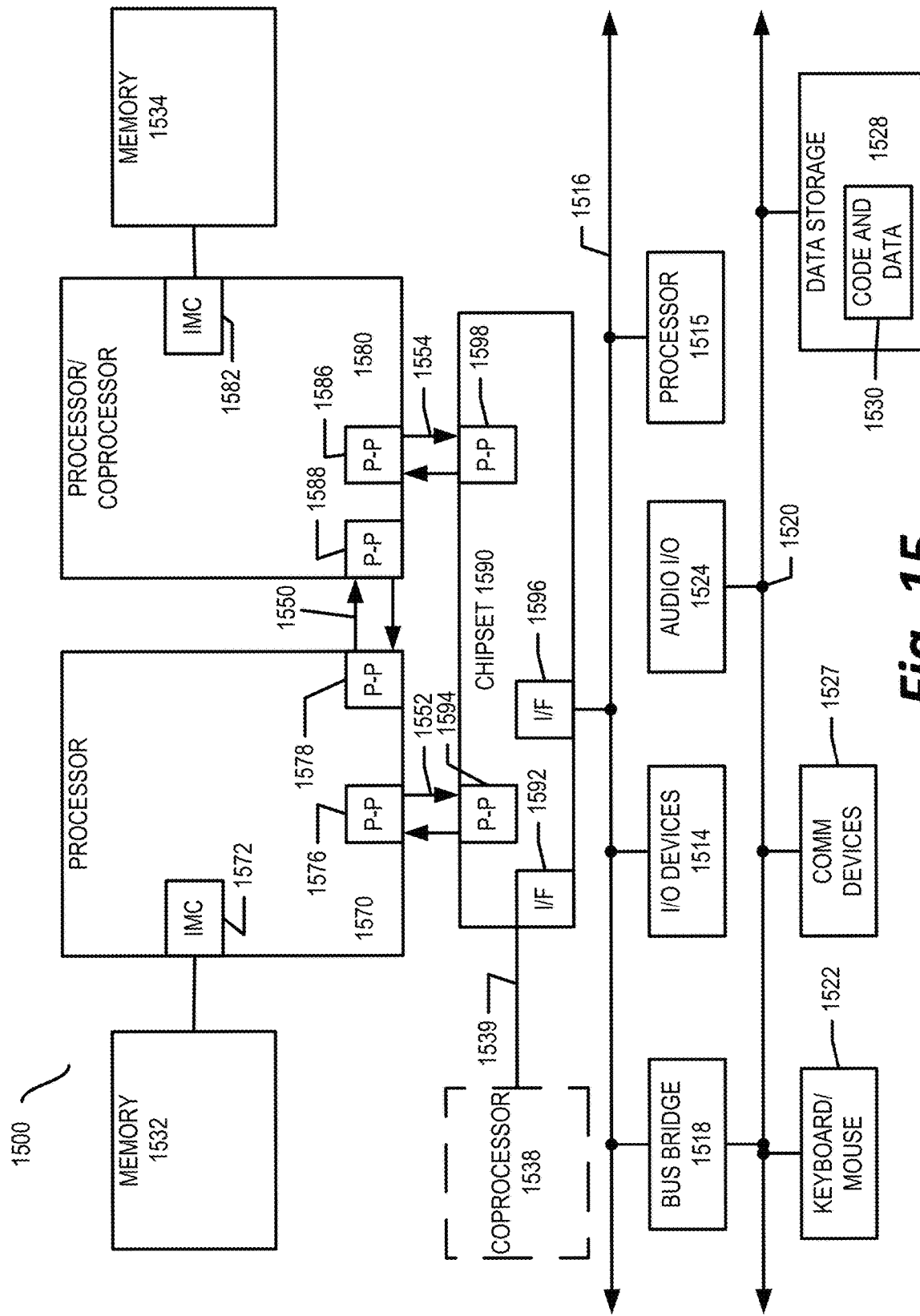

Referring now to FIG. 15, shown is a block diagram of a first more specific example system 1500. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1539. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a peripheral component interconnect (PCI) bus, or a bus such as a PCI Express bus or another third generation IO interconnect bus, by way of nonlimiting example.

Figure 16:
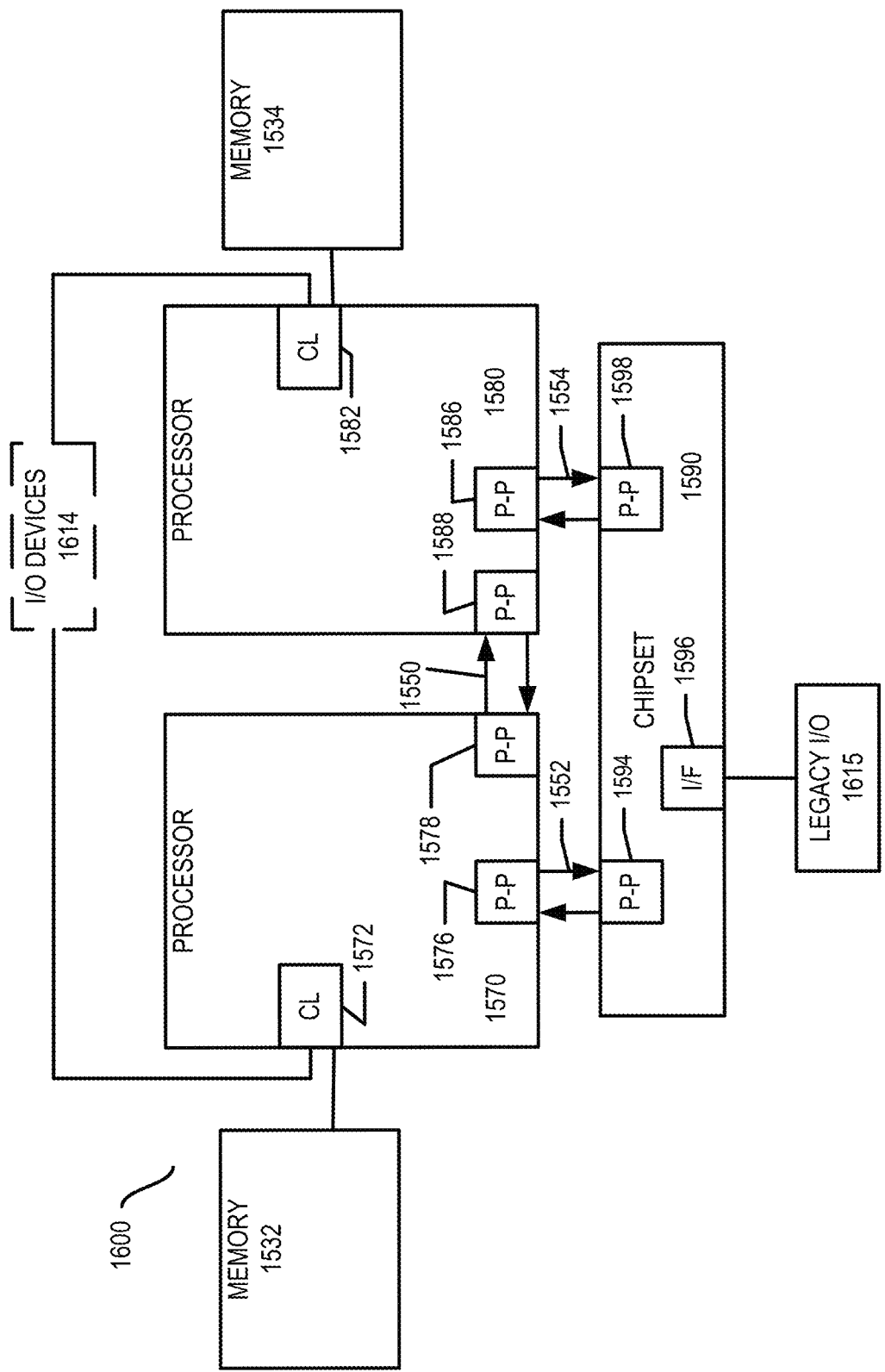

As shown in FIG. 16, various IO devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPUs, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions or code and data 1530, in one embodiment. Further, an audio IO 1524 may be coupled to the second bus 1520. Note that other architectures are possible. For example, instead of the point-to-point architecture of FIG. 15, a system may implement a multidrop bus or other such architecture.

Referring now to FIG. 16, shown is a block diagram of a second more specific example system 1600. FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and IO control logic ("CL") 1572 and 1582, respectively. Thus, the CL 1572, 1582 include integrated memory controller units and include IO control logic. FIG. 16 illustrates that not only are the memories 1532, 1534 coupled to the CL 1572, 1582, but also that IO devices 1614 are also coupled to the control logic 1572, 1582. Legacy IO devices 1615 are coupled to the chipset 1590.

Figure 17:
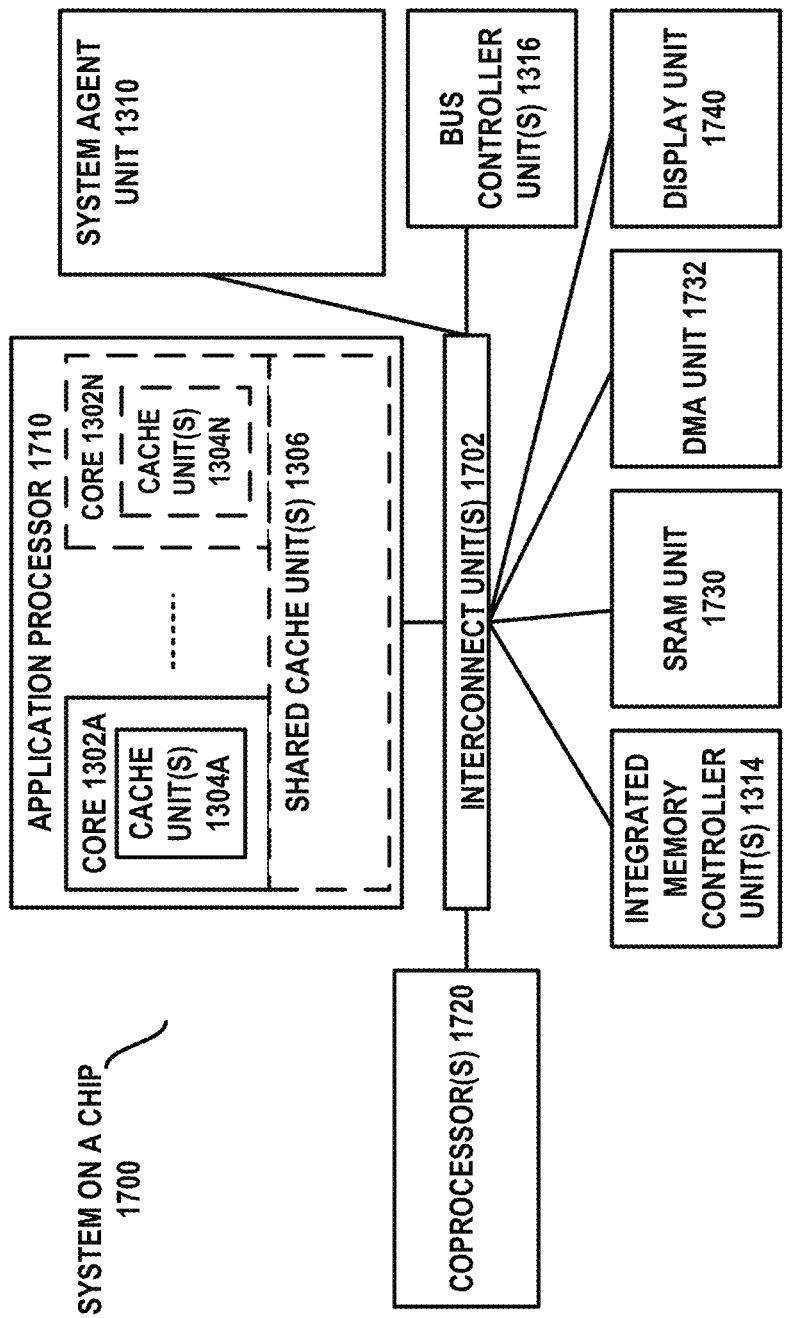

Referring now to FIG. 17, shown is a block diagram of a SoC 1700 in accordance with an embodiment. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 1302A-N and shared cache unit(s) 1306; a system agent unit 1310; a bus controller unit(s) 1316; an integrated memory controller unit(s) 1314; a set of one or more coprocessors 1720 which may include integrated graphics logic, an image processor, an audio processor, and a video processor; a static random access memory (SRAM) unit 1730; a direct memory access (DMA) unit 1732; and a display unit 1740 for coupling to one or more external displays. In one embodiment, the coprocessor(s) 1720 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Some embodiments may be implemented as computer programs or program code executing on programmable systems comprising at least one processor, a storage system (including volatile and nonvolatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application-specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, nontransitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, some embodiments also include nontransitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation or dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 18 is a block diagram contrasting the use of a software instruction converter to convert binary instructions in a source instruction set to binary instructions in a target instruction set. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

As used throughout this specification, the term "processor" or "microprocessor" should be understood to include not only a traditional microprocessor (such as industry-leading x86 and x64 architectures by Intel®), but also any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field-programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, nontransitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A nontransitory storage medium herein is expressly intended to include any nontransitory special-purpose or programmable hardware configured to provide the disclosed operations, or to cause a processor to perform the disclosed operations. A nontransitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. section 812, as it exists on the date of the filing hereof, unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

There is disclosed in one example, an apparatus, comprising: a deterministic monitored device; an interconnect to communicatively couple the monitored device to a support circuit; a super queue to queue transactions between the monitored device and the support circuit, the super queue comprising an operational segment and a shadow segment; a debug data structure; and a system management agent to monitor transactions in the operational segment, log corresponding transaction identifiers in the shadow segment, and write debug data to the debug data structure, wherein the debug data are at least partly based on the corresponding transaction identifiers.

There is further disclosed an example of an apparatus, wherein the support circuit is non-deterministic.

There is further disclosed an example of an apparatus, wherein the operational segment and the shadow segment are equal in size.

There is further disclosed an example of an apparatus, wherein the system management agent is to identify a transaction in the operational segment as an outbound transaction, and to not log the outbound transaction in the debug data.

There is further disclosed an example of an apparatus, wherein the system management agent is to log a corresponding inbound operation to the shadow segment.

There is further disclosed an example of an apparatus, wherein the outbound transaction is a read, the corresponding inbound transaction is an inbound write, and the system agent is to log a time stamp for the inbound write, and a result code in the shadow segment.

There is further disclosed an example of an apparatus, wherein the system management agent is further to log the inbound data.

There is further disclosed an example of an apparatus, wherein the system management agent is configured to opportunistically or periodically log outbound transactions for synchronization.

There is further disclosed an example of an apparatus, wherein the system management agent is further to log asynchronous transactions.

There is further disclosed an example of an apparatus, wherein the system management agent is further to log snoops for outbound transactions.

There is further disclosed an example of an apparatus, wherein the monitored device is a processor core.

There is further disclosed an example of an apparatus, wherein the support circuit is an uncore circuit.

There is further disclosed an example of an apparatus, wherein the support circuit is an intellectual property (IP) block.

There is further disclosed an example of an apparatus, wherein the monitored device is a graphics processor.

There is also disclosed an example of a computer apparatus, comprising: a deterministic core; a non-deterministic support circuit; an interconnect to communicatively couple the core to the support circuit; a super queue to queue transactions between the core and the support circuit, the super queue comprising an operational segment and a shadow segment; a debug data structure; and a system management agent to monitor transactions in the operational segment, log corresponding transaction identifiers in the shadow segment, and write debug data to the debug data structure, wherein the debug data are at least partly based on the corresponding transaction identifiers.

There is further disclosed an example of a computer apparatus, wherein the operational segment and the shadow segment are equal in size.

There is further disclosed an example of a computer apparatus, wherein the system management agent is to identify a transaction in the operational segment as an outbound transaction, and to not log the outbound transaction in the debug data.

There is further disclosed an example of a computer apparatus, wherein the system management agent is to log a corresponding inbound operation to the shadow segment.

There is further disclosed an example of a computer apparatus, wherein the outbound transaction is a read, the corresponding inbound transaction is an inbound write, and the system agent is to log a time stamp for the inbound write, and a result code in the shadow segment.

There is further disclosed an example of a computer apparatus, wherein the system management agent is further to log the inbound data.

There is further disclosed an example of a computer apparatus, wherein the system management agent is configured to opportunistically or periodically log outbound transactions for synchronization.

There is further disclosed an example of a computer apparatus, wherein the system management agent is further to log asynchronous transactions.

There is further disclosed an example of a computer apparatus, wherein the system management agent is further to log snoops for outbound transactions.

There is further disclosed an example of a computer apparatus, wherein the support circuit is an intellectual property (IP) block.

There is further disclosed an example of a system-on-a-chip, comprising the apparatus of a number of the above examples.

There is further disclosed an example of a debug system, comprising the computing apparatus of a number of the above examples, and an emulator to emulate a portion of the computing apparatus according to the debug instructions.

There is further disclosed an example of a debug system of the above example, wherein the portion of the computing apparatus is the core.

There is also disclosed a method of providing debug information for a computing apparatus, comprising: communicatively coupling a deterministic monitored device to a support circuit via an interconnect; dividing a super queue into an operational segment and a shadow segment, the super queue to queue transactions between the monitored device and the support circuit; provisioning a debug data structure; and monitoring transactions in the operational segment; logging corresponding transaction identifiers in the shadow segment; and writing debug data to the debug data structure, wherein the debug data are at least partly based on the corresponding transaction identifiers.

There is further disclosed a method of providing debug information for a computing apparatus, wherein the support circuit is non-deterministic.

There is further disclosed a method of providing debug information for a computing apparatus, wherein the operational segment and the shadow segment are equal in size.

There is further disclosed a method of providing debug information for a computing apparatus, further comprising identifying a transaction in the operational segment as an outbound transaction, and not logging the outbound transaction in the debug data.

There is further disclosed a method of providing debug information for a computing apparatus, further comprising logging a corresponding inbound operation to the shadow segment.

There is further disclosed a method of providing debug information for a computing apparatus, wherein the outbound transaction is a read, the corresponding inbound transaction is an inbound write, further comprising logging a time stamp for the inbound write, and a result code in the shadow segment.

There is further disclosed a method of providing debug information for a computing apparatus, further comprising opportunistically or periodically logging outbound transactions for synchronization.

There is further disclosed a method of providing debug information for a computing apparatus, further comprising logging asynchronous transactions.

There is further disclosed a method of providing debug information for a computing apparatus, further comprising logging snoops for outbound transactions.

There is further disclosed a method of providing debug information for a computing apparatus, wherein the monitored device is a processor core.

There is further disclosed a method of providing debug information for a computing apparatus, wherein the support circuit is an uncore circuit.

There is further disclosed a method of providing debug information for a computing apparatus, wherein the support circuit is an intellectual property (IP) block.

There is further disclosed a method of providing debug information for a computing apparatus, wherein the monitored device is a graphics processor.

There is further disclosed an example of an apparatus comprising means for performing the method of a number of the above examples.

There is further disclosed an example of an apparatus, wherein the apparatus comprises a system on a chip.

There is also disclosed a debug system comprising an apparatus, and an emulator to emulate a portion of the computing apparatus according to the debug instructions.

There is further disclosed a debug system, wherein the portion of the computing apparatus is the core.

What is claimed is:

1. An apparatus, comprising:
a deterministic monitored device;
an interconnect to communicatively couple the monitored device to a support circuit;
a super queue comprising circuitry to queue transactions between the monitored device and the support circuit, the super queue comprising an operational segment to queue outbound transactions from the deterministic monitored device to the support circuit, and a shadow segment to log inbound transactions from the support circuit to the deterministic monitored device; and
a system management agent comprising circuitry to monitor outbound transactions queued in the operational segment, log inbound transactions in the shadow segment based on the monitored outbound transactions, and write debug data a debug data structure, wherein the debug data are at least partly based on the logged inbound transactions.

2. The apparatus of claim 1, wherein the support circuit is non-deterministic.

3. The apparatus of claim 1, wherein the operational segment and the shadow segment are equal in size.

4. The apparatus of claim 1, wherein the system management agent circuitry is to identify a transaction in the operational segment as an outbound transaction, and to not log the outbound transaction in the debug data.

5. The apparatus of claim 4, wherein the outbound transaction is a read, the inbound operation corresponding to the outbound transaction is an inbound write, and the system management agent circuitry is to log, in the shadow segment, a time stamp for the inbound write and a result code.

6. The apparatus of claim 5, wherein the system management agent circuitry is further to log the inbound data associated with the inbound write.

7. The apparatus of claim 4, wherein the system management agent circuitry is configured to opportunistically or periodically log outbound transactions for synchronization.

8. The apparatus of claim 1, wherein the system management agent circuitry is further to log asynchronous transactions.

9. The apparatus of claim 1, wherein the system management agent circuitry is further to log snoops for outbound transactions.

10. The apparatus of claim 1, wherein the monitored device is a processor core.

11. The apparatus of claim 10, wherein the support circuit is an uncore circuit.

12. The apparatus of claim 10, wherein the support circuit is an intellectual property (IP) block.

13. The apparatus of claim 1, wherein the monitored device is a graphics processor.

14. A computing apparatus, comprising:
a deterministic core;
a non-deterministic support circuit;
an interconnect to communicatively couple the core to the support circuit;
a super queue comprising circuitry to queue transactions between the core and the support circuit, the super queue comprising an operational segment to queue outbound transactions from the deterministic core to the non-deterministic support circuit, and a shadow segment to log inbound transactions from the non-deterministic support circuit to the deterministic core;
an emulation store; and
a system management agent comprising circuitry to monitor outbound transactions queued in the operational segment, log inbound transaction in the shadow segment based on the monitored outbound transactions, write debug data to a debug data structure, and store the debug data structure in the emulation store, wherein the debug data are at least partly based on the logged inbound transactions.

15. The computing apparatus of claim 14, wherein the operational segment and the shadow segment are equal in size.

16. The computing apparatus of claim 14, wherein the system management agent circuitry is to identify a transaction in the operational segment as an outbound transaction, and to not log the outbound transaction in the debug data.

17. The computing apparatus of claim 16, wherein the outbound transaction is a read, the inbound operation corresponding to the outbound transaction is an inbound write, and the system management agent circuitry is to log, in the shadow segment, a time stamp for the inbound write and a result code.

18. The computing apparatus of claim 17, wherein the system management agent circuitry is further to log the inbound data associated with the inbound write.

19. The computing apparatus of claim 16, wherein the system management agent circuitry is configured to opportunistically or periodically log outbound transactions for synchronization.

20. The computing apparatus of claim 14, wherein the system management agent circuitry is further to log asynchronous transactions.

21. The computing apparatus of claim 14, wherein the system management agent circuitry is further to log snoops for outbound transactions.

22. The computing apparatus of claim 14, wherein the support circuit is an intellectual property (IP) block.

* * * * *